US012235632B1

(12) United States Patent
Kaufman et al.

(10) Patent No.: US 12,235,632 B1
(45) Date of Patent: Feb. 25, 2025

(54) LIGHT ACTIVATED ACCESS CONTROL TECHNIQUES

(71) Applicant: Amazon Technologies, Inc., Seattle, WA (US)

(72) Inventors: Seth R Kaufman, Arlington, MA (US); Arnav Kavadia, Shrewsbury, MA (US); Nathaniel William Hixon, Framingham, MA (US); Monish Narendra Kapadia, Framingham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 421 days.

(21) Appl. No.: 17/853,118

(22) Filed: Jun. 29, 2022

(51) Int. Cl.
| | | |
|---|---|---|
| *G05B 19/418* | (2006.01) | |
| *G07C 9/10* | (2020.01) | |
| *G07C 9/22* | (2020.01) | |
| *G07C 9/27* | (2020.01) | |

(52) U.S. Cl.
CPC ........... *G05B 19/4189* (2013.01); *G07C 9/10* (2020.01); *G07C 9/22* (2020.01); *G07C 9/27* (2020.01); *G05B 2219/40298* (2013.01)

(58) Field of Classification Search
CPC ...... G05B 19/4189; G05B 2219/40298; G07C 9/10; G07C 9/22; G07C 9/27; G06F 7/00
USPC .......................... 340/5.7, 5.72; 700/213, 214
See application file for complete search history.

(56) References Cited

U.S. PATENT DOCUMENTS

| | | | |
|---|---|---|---|
| 5,382,948 A | 1/1995 | Richmond | |
| 7,912,574 B2* | 3/2011 | Wurman | G06Q 10/087 705/28 |
| 8,280,547 B2 | 10/2012 | D'Andrea et al. | |
| 8,884,739 B2 | 11/2014 | Shimomura | |
| 9,087,314 B2 | 7/2015 | Hoffman et al. | |
| 9,104,271 B1 | 8/2015 | Adams et al. | |
| 10,387,032 B2 | 8/2019 | Lane et al. | |
| 10,419,886 B2 | 9/2019 | Yang et al. | |
| 10,477,369 B2* | 11/2019 | Berg | H04W 12/068 |
| 10,600,264 B2* | 3/2020 | Kayhani | G06V 40/16 |
| 10,607,132 B1* | 3/2020 | Dietz | H04W 4/35 |

(Continued)

OTHER PUBLICATIONS

U.S. Appl. No. 16/360,989, Notice of Allowance, Nov. 22, 2019, 12 pages.

*Primary Examiner* — Nam V Nguyen
(74) *Attorney, Agent, or Firm* — Kilpatrick Townsend & Stockton LLP

(57) ABSTRACT

Techniques for performing automated device activation and managing access to a workspace are described herein. While operating in an activated state, a user device (e.g., a wearable device) may be configured to modify movements of various mobile components (e.g., mobile drive units, robotic arms, etc.) of the workspace by emitting signals that cause the mobile components to stop or reduce speed when in proximity of the user device. An access controller device (ACD) may be used to restrict and/or allow access to the workspace and to perform operations for activating a user device that is attempting access. The ACD may receive light emissions from the user device that may be used to initiate a process for activating the user device. When the ACD receives an indication that the user device is operating in the activated state, the ACD may execute operations for enabling access to the workspace.

20 Claims, 12 Drawing Sheets

(56) References Cited

U.S. PATENT DOCUMENTS

| | | | |
|---|---|---|---|
| 11,495,071 B2* | 11/2022 | Tzirimis | ................. G07C 9/27 |
| 11,893,849 B2* | 2/2024 | Szigeti | .................... G07C 9/22 |
| 2010/0096490 A1 | 4/2010 | Gordon | |
| 2012/0151339 A1 | 6/2012 | Zhang et al. | |
| 2013/0302132 A1 | 11/2013 | D'Andrea | |
| 2013/0304253 A1 | 11/2013 | Wurman et al. | |
| 2013/0314503 A1 | 11/2013 | Nix et al. | |
| 2014/0070934 A1 | 3/2014 | Chau et al. | |
| 2016/0284147 A1* | 9/2016 | Trani | ...................... G07C 9/27 |
| 2017/0334696 A1 | 11/2017 | Otto et al. | |
| 2018/0039402 A1 | 2/2018 | Lane et al. | |
| 2019/0013960 A1 | 1/2019 | Sadwick | |
| 2019/0089193 A1 | 3/2019 | Ranjan et al. | |
| 2019/0196488 A1 | 6/2019 | Holmberg | |
| 2019/0226266 A1 | 7/2019 | Eslami et al. | |

\* cited by examiner

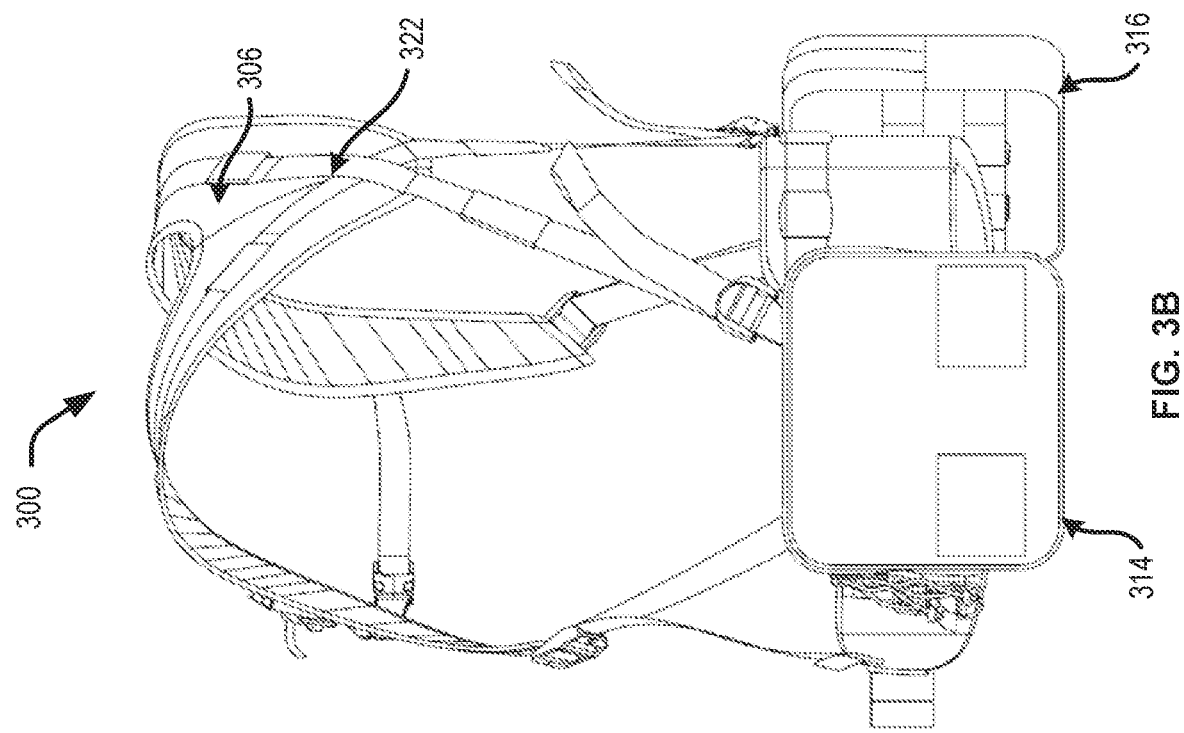
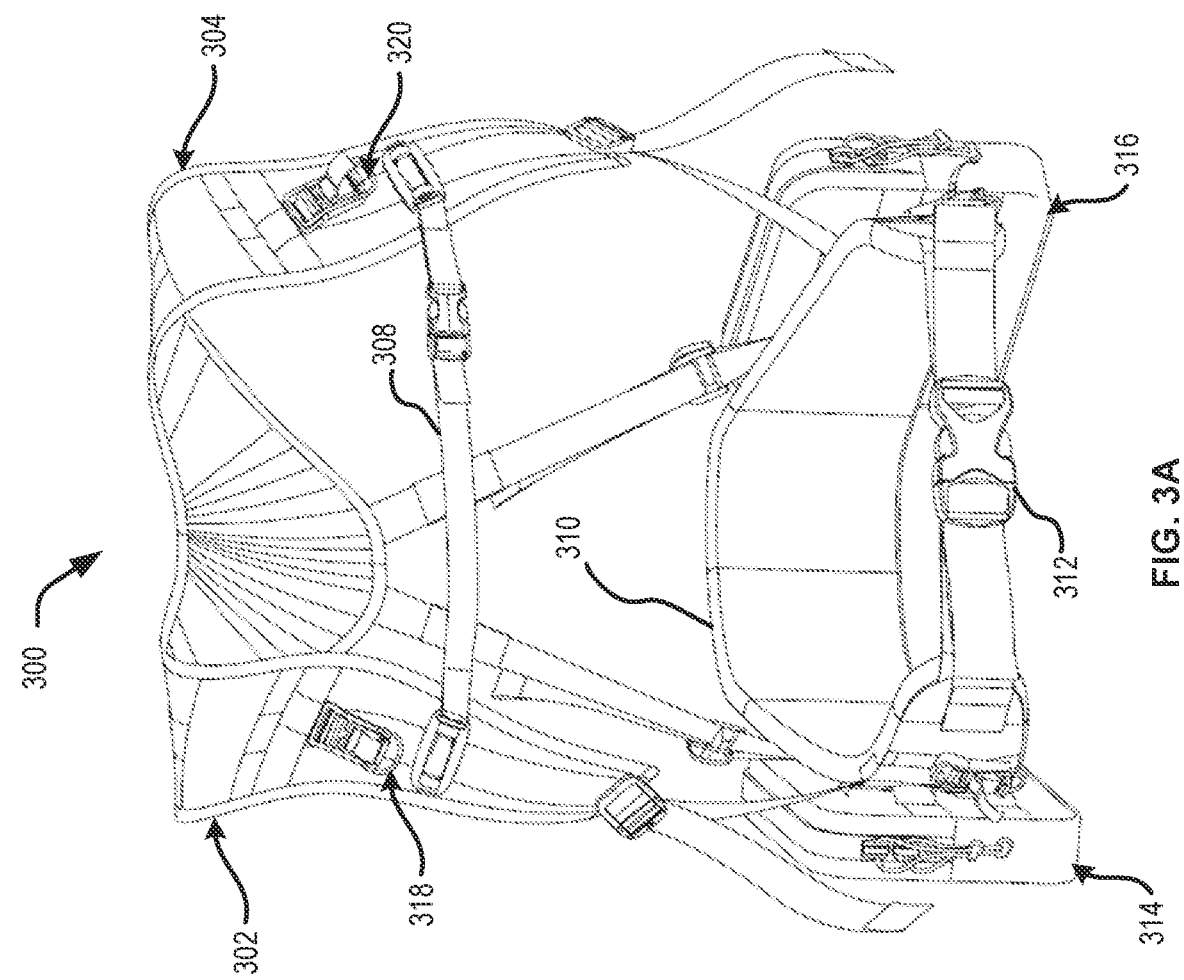
FIG. 3A
FIG. 3B

LIGHT ACTIVATED ACCESS CONTROL TECHNIQUES

BACKGROUND

Modern inventory systems, such as those in mail order warehouses, supply chain distribution centers, airport luggage systems, and custom-order manufacturing facilities, often utilize mobile robotic devices to move items and/or storage containers within a workspace. Coordinating tasks between the various components of these systems can be cumbersome. As inventory systems grow, the challenges of simultaneously completing a large number of packing, storing, and other inventory-related tasks utilizing these components becomes non-trivial. In systems tasked with responding to large numbers of diverse task requests, inefficient utilization of system resources, including space and equipment can result in lower throughput, unacceptably long response times, an ever-increasing backlog of unfinished tasks, and, in general, poor system performance. Coordination between various components of these systems is desirable to improve efficiency and throughput.

BRIEF DESCRIPTION OF THE DRAWINGS

Various embodiments in accordance with the present disclosure will be described with reference to the drawings, in which:

FIGS. 3A and 3B illustrates schematic diagrams depicting alternate views of a wearable article configured to receive the user device of FIG. 2, in accordance with at least one embodiment;

DETAILED DESCRIPTION

Figure 1:
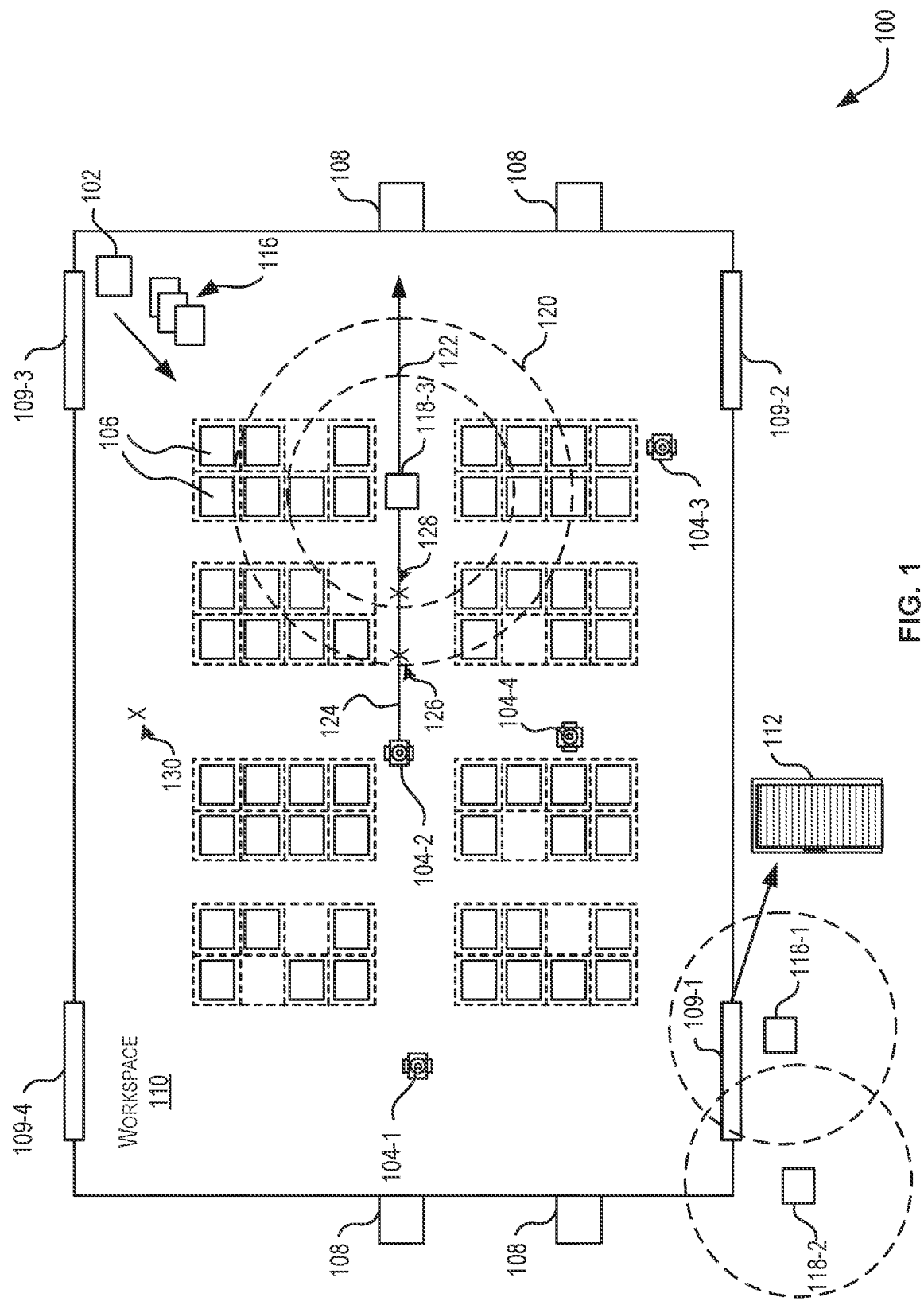
FIG. 1 is a schematic diagram illustrating an example environment suitable for implementing aspects of an inventory management system, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order so as not to obscure the embodiment being described. Although examples may be provided which include an inventory system and/or workspace, it should be appreciated that the same techniques may be applied in a variety of contexts such as mail order warehouses, supply chain distribution centers, airport luggage systems, grocery stores, and custom-order manufacturing facilities, to name a few.

Embodiments herein are directed to an inventory management system having multiple storage containers and mobile drive units (MDUs) for moving the storage containers and other items within a workspace managed by the inventory management system. As used herein, a "mobile drive unit" (MDU) may include any suitable autonomous guided vehicle, or other suitable automated or semi-automated vehicle associated with an inventory management system. A variety of user devices (e.g., handheld devices, wearable devices, etc.) may be utilized within the inventory management system and a variety of interactions may occur between components of the inventory management system. Specifically, systems and methods are provided for managing these device interactions. Access to various areas of the workspace may be restricted by the system using a variety of barrier devices (e.g., doors, gates, light curtains, etc.). In some embodiments, access may be physically allowed or restricted using a barrier device that places and/or remove a physical barrier (e.g., a door, a gate, etc.) through one or more actuators. In some embodiments, the barrier device may be used to allow or restrict access using a barrier (e.g., light) which does not physically restrict a user from entering/exiting the controlled area.

In at least one embodiment, mobile drive units (MDUs) may operate within the workspace in an autonomous or semi-autonomous fashion to perform a variety of tasks assigned by the inventory management system. A user may enter the workspace through any suitable number of access points. The user may wear or otherwise carry a user device configured with one or more transmitters that periodically transmit one or more signals (e.g., two frequency signals of differing frequencies). In response to receiving the signal(s) transmitted by the user device (e.g., a vest configured with the transmitter(s)), the MDU may be configured to modify that manner by which it moves within the workspace. As a non-limiting example, the MDU may slow or stop all together when and/or while it receives the signal(s). Conventionally, the user device was activated (e.g., configured to transmit the signal(s)) through a variety of manual actions. Access to the workspace was not managed, or at least access was not managed using the user device.

The disclosed techniques integrate and automate activation of the user device with workspace access management processes and enable an improved method for controlling access to the workspace. The user device may be configured with a feedback device (e.g., a light emitting diode (LED)) that emits light (e.g., a yellow light, a green light, a flashing green light, a red light, etc.) to indicate an operational status of the user device. Access to the workspace may be blocked by default (e.g., via a locked door or gate, via an activated light curtain, etc.). The system may be configured to verify that a user device is operational and working correctly before access to the workspace is granted. In some embodiments, the user device may be configured to transmit data (e.g., identification information indicating the identity of the user device) over the air (e.g., via one or more radio signals). An access control unit located at an access point of the workspace may receive the identification information. The user may approach the access point and position a feedback device of the user device (e.g., the LED) near a receiving device of the access point (e.g., a receiving device configured to receive light). The feedback device may be configured to provide identification information of the user device based at least in part on modulating the visible light provided by the LED. The access control unit may be configured to determine whether the identification information received over the air matches the identification information provided at the receiving device of the access point. If the information matches, the access control unit may execute operations to request activation of the user device via a management system of the workspace. The management system may communicate with the user device over a wireless connection (e.g., WiFi) to verify that various components of the user device are operating properly. If so, the management system may transmit (e.g., to the access control unit, to the user device, etc.) an indication that the user device is activated. Upon receiving this indication, the access control unit may execute operations to allow the user access to the workspace (e.g., unlock a door or gate, deactivate a light curtain, etc.).

Upon exiting the workspace, an indication may be provided at the exit point (e.g., via a light, via an audible alarm, etc.) to remind the user to deactivate the user device. The user may position the feedback device at the receiving device of the access point to once again provide its identification information (e.g., via LED modulations). The access control unit may transmit the received identification information to the management system. The management system may transmit information to the user device to cause the user device to deactivate. In a deactivated state, the user device no longer transmits data that would cause MDUs in the workspace to modify their movements.

Utilizing the techniques, devices, and device interactions discussed above, the operations for activating the user device may be automated and required before access to the workspace may be granted. This may result in an enhanced user experience and reduce the chance of user error and/or allowing a faulty or deactivated user device to enter the workspace. Additionally, at least one component of the user device (e.g., the feedback device) can be utilized for multiple purposes such as providing visible feedback of the operational status of the user device as well as providing identification information that may be used to activate or deactivate the device. By utilizing the described techniques, the efficiency of the system as a whole may be improved as the procedures for activating the user device are simplified. The system may experience increased throughput and improved efficient as a whole by reducing the chance of collisions and/or of introducing faulty user devices within the workspace that might detrimentally modify movements of various components of the workspace.

FIG. 1 is a schematic diagram illustrating an example workspace 110 suitable for implementing aspects of an inventory management system 100, in accordance with at least one embodiment. As a non-limiting example, the inventory management system 110 may include a workspace management module 102, one or more mobile drive units (e.g., mobile drive unit 104-1, mobile drive unit 104-2, mobile drive unit 104-3, and mobile drive unit 104-4, hereinafter collectively referred to as "mobile drive units 104"), one or more storage containers 106, one or more workstations 108 within the workspace 110, and one or more access points (e.g., access point 109-1, access point 109-2, access point 109-3, access point 109-4, herein collectively referred to as "access points 109"). In some embodiments, workstations 108 may include an area for which specific tasks are performed (e.g., packing items within a shipping container, taking inventory of the items within workspace 110, managing other operators of the workspace 110, and the like). Workspace 110 may include any suitable number of workstations 108 and/or access points 109, not necessarily the number depicted in FIG. 1.

In some embodiments, the mobile drive units 104 may transport storage containers 106 between points within a workspace 110 (e.g., a warehouse, a storage facility, or the like) in response to commands communicated by workspace management module 102. While the workspace management module 102 is depicted in FIG. 1 as being separate from the mobile drive units 104, it should be appreciated that the workspace management module 102, or at least some aspects of the workspace management module 102, may be additionally or alternatively be performed by a processor of the mobile drive units 104. Within the workspace 110, each of the storage containers 106 may store one or more types of inventory items. As a result, the inventory system may be capable of moving inventory items between locations within the workspace 110 to facilitate the entry, processing, and/or removal of inventory items from inventory system and the completion of other tasks involving inventory items.

The workspace management module 102 may assign tasks to appropriate components (e.g., mobile drive units 104, various operators, etc.) of the inventory management system and coordinate operation of the various components in completing the tasks. The workspace management module 102 may select components of inventory system (e.g., one or more mobile drive units 104 and/or one or more operators, etc.) to perform these tasks and communicate appropriate commands and/or data to the selected components and/or devices associated with the selected components to facilitate completion of these operations. In some embodiments, an operator may utilize a handheld user device such as a scanner, a smart device, or the like to receive such commands or exchange any suitable information with the workspace management module 102. Although shown in FIG. 1 as a single, discrete component, the workspace management module 102 may represent multiple components and may represent or include portions of the mobile drive units 104 or other elements of the inventory management system.

The mobile drive units 104 may move storage containers 106 between locations within the workspace 110. The mobile drive units 104 may represent any devices or components appropriate to move (e.g., propel, pull, etc.) a storage container based on the characteristics and configuration of the storage containers 106 and/or other elements of inventory system. In a particular embodiment of inventory system, the mobile drive units 104 represent independent, self-powered devices configured to freely move about the workspace 110. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 104 represent elements of a tracked inventory system configured to move the storage containers 106 along tracks, rails, cables, crane system, or other guidance or support elements traversing the workspace 110. In such an embodiment, the mobile drive units 104 may receive power and/or support through a connection to the guidance elements, such as a powered rail. Additionally, in particular embodiments of the inventory system, the mobile drive units 104 may be configured to utilize alternative conveyance equipment to move within the workspace 110 and/or between separate portions of the workspace 110.

Additionally, the mobile drive units 104 may be capable of communicating with the workspace management module 102 to receive information identifying selection of the storage containers 106, transmit the locations of the mobile drive units 104, or exchange any other suitable information to be used by the workspace management module 102 or the mobile drive units 104 during operation. The mobile drive units 104 may communicate with the workspace management module 102 wirelessly, using wired connections between the mobile drive units 104 and the workspace management module 102, and/or in any other appropriate manner. As one example, particular embodiments of the mobile drive unit 104 may communicate with the workspace management module 102 and/or with one another using 802.11, Bluetooth, or Infrared Data Association (IrDA) standards, or any other appropriate wireless communication protocol. As another example, in a tracked inventory system, tracks or other guidance elements upon which the mobile drive units 104 move may be wired to facilitate communication between the mobile drive units 104 and other components of the inventory system. In general, the mobile drive units 104 may be powered, propelled, and controlled in any manner appropriate based on the configuration and characteristics of the inventory system.

In at least one embodiment, the storage containers 106 store inventory items. The storage containers 106 are capable of being carried, rolled, and/or otherwise moved by the mobile drive units 104. In some embodiments, the storage containers 106 may include a plurality of faces, and each storage component (e.g., a bin, a tray, a shelf, an alcove, etc.) may be accessible through one or more faces of the storage container 106. The mobile drive units 104 may be configured to rotate the storage containers 106 at appropriate times to present a particular face to an operator or other components of the inventory system.

In at least one embodiment, inventory items represent any objects suitable for storage, retrieval, and/or processing in an automated inventory system. For the purposes of this description, "inventory items" (also referred to as "items" or "an item") may represent any one or more objects of a particular type that are stored in the inventory system. In at least one example, the inventory system may represent a mail order warehouse facility (e.g., operated by an electronic marketplace provider), and the items within the warehouse facility may represent merchandise stored in the warehouse facility. As a non-limiting example, the mobile drive units 104 may retrieve the storage containers 106 containing one or more inventory items requested in an order to be packed for delivery to a customer. Moreover, in some embodiments of the inventory system, boxes containing completed orders may themselves represent inventory items.

In some embodiments, the inventory system may also include one or more workstations 108. The workstations 108 represent locations designated for the completion of particular tasks involving inventory items. Such tasks may include the removal of inventory items from the storage containers 106, the introduction of inventory items into the storage containers 106, the counting of inventory items in the storage containers 106, the decomposition of inventory items (e.g. from pallet- or case-sized groups to individual inventory items), the consolidation of inventory items between the storage containers 106, and/or the processing or handling of inventory items in any other suitable manner, to name a few. In particular embodiments, the workstations 108 may represent the physical locations where a particular task involving inventory items can be completed within the workspace 110. In alternative embodiments, the workstations 108 may represent both the physical location and also any appropriate equipment for processing or handling inventory items, such as robotic arms, scanners for monitoring the flow of inventory items in and out of the inventory system, communication interfaces for communicating with the workspace management module 102, and/or any other suitable components. The workstations 108 may be controlled, entirely or in part, by operators or may be fully automated. Moreover, operators may be capable of performing certain tasks involving inventory items, such as packing, counting, or transferring inventory items, as part of the operation of the inventory system.

In at least one embodiment, the workspace 110 represents an area associated with the inventory system in which the mobile drive units 104 can move and/or the storage containers 106 can be stored. For example, the workspace 110 may represent all or part of the floor of a mail-order warehouse in which the inventory system operates. Although FIG. 1 shows, for the purposes of illustration, an embodiment of the inventory system in which the workspace 110 includes a fixed, predetermined, and finite physical space, particular embodiments of the inventory system may include a workspace of variable dimensions and/or an arbitrary geometry. While FIG. 1 is intended to illustrate a workspace 110 that is entirely enclosed in a building, in some embodiments, some or all of the workspace 110 is located outdoors, within a vehicle (such as a cargo ship), or otherwise unconstrained by any fixed structure.

In operation, the workspace management module 102 may select appropriate components to complete particular tasks and may transmit task assignments 116 to the selected components to trigger completion of the relevant tasks. Each of the task assignments 116 defines one or more tasks to be completed by a particular component (e.g., one or more mobile drive units 104, one or more operators, etc.). These tasks may relate to the retrieval, storage, replenishment, and counting of inventory items and/or the management of the mobile drive units 104, the storage containers 106, the operators, the workstations 108 and/or other components of the inventory system. Depending on the component and the task to be completed, a task assignment may identify locations, components, and/or actions/commands associated with the corresponding task and/or any other appropriate information to be used by the relevant component in completing the assigned task.

In particular embodiments, the workspace management module 102 may generate task assignments 116 based, in part, on inventory requests that the workspace management module 102 receives from other components of the inventory system and/or from external components in communication with the workspace management module 102. These inventory requests identify particular operations to be completed involving inventory items stored or to be stored within the inventory system and may represent communication of any suitable form. For example, in particular embodiments, an inventory request may represent a shipping order specifying particular inventory items that have been purchased by a customer and that are to be retrieved from the inventory system for shipment to the customer. The workspace management module 102 may generate the task assignments 116 based at least in part on any suitable stimuli such as user input and/or a system determination indicating a maintenance task to be performed. After generating one or more of the task assignments 116, the workspace management module 102 may transmit the generated task assignments 116 to appropriate components (e.g., mobile drive units 104, computing devices associated with operators, etc.) for completion of the corresponding task. The relevant components may then execute their assigned tasks.

With respect to the mobile drive units 104 specifically, the workspace management module 102 may, in particular embodiments, communicate task assignments 116 to selected mobile drive units 104 that identify one or more destinations for the selected mobile drive units 104. The workspace management module 102 may select a mobile drive unit (e.g., mobile drive unit 104-2) to assign the relevant task based on the location or state of the selected mobile drive unit, an indication that the selected mobile drive unit has completed a previously-assigned task, a predetermined schedule, and/or any other suitable consideration. These destinations may be associated with an inventory request the workspace management module 102 is executing or a management objective the workspace management module 102 is attempting to fulfill. For example, the task assignment may define the location of a storage container 106 to be retrieved, a workstation 108 to be visited, or a location associated with any other task appropriate based on the configuration, characteristics, and/or state of inventory system, as a whole, or individual components of the inventory system.

As part of completing these tasks the mobile drive units 104 may dock with and transport the storage containers 106 within the workspace 110. The mobile drive units 104 may dock with the storage containers 106 by connecting to, lifting, and/or otherwise interacting with the storage containers 106 in any other suitable manner so that, when docked, the mobile drive units 104 are coupled to and/or support the storage containers 106 and can move the storage containers 106 within the workspace 110. The mobile drive units 104 and storage containers 106 may be configured to dock in any manner suitable to allow a mobile drive unit to move a storage container within workspace 110. In some embodiments, the mobile drive units 104 represent all or portions of the storage containers 106. In such embodiments, the mobile drive units 104 may not dock with the storage containers 106 before transporting the storage containers 106 and/or the mobile drive units 104 may each remain continually docked with a storage container.

In some embodiments, the workspace management module 102 may be configured to communicate the task assignments 116 to user devices (e.g., handheld user devices such as scanners, tablets, smartphones, etc.) associated with an operator to instruct the operator to perform one or more tasks. The user device may further be configured to enable the user to view, via a graphical user interface, various components of the workspace while in operation. The user device may further be configured to enable a user to provide planned path data indicating an intended traversal path of the user within the workspace. The mobile drive units 104 and/or the user devices (e.g., handheld user devices) may individually be configured to provide task performance information to the workspace management module 102. Task performance information may include any suitable data related to the performance of an assigned task. By way of example, a mobile drive unit may send task performance information to the workspace management module 102 indicating that the task of moving a particular storage container to a particular station has been completed. A user device associated with a particular operator may transmit task performance information to the workspace management module 102 indicating that an item has been placed in or removed from the selected storage container, a maintenance task has been completed, or the like. Generally, any suitable information associated with task performance (e.g., a task identifier, a time of completion, an error code or other indication that the task was unsuccessful, a reason code or other indication as to why task performance was unsuccessful, etc.) may be provided as part of the task performance information.

Additional user devices (e.g., user device 118-1, user device 118-2, user device 118-3, etc., herein after collectively referred to as "user devices 118). The user devices 118 may individually include one or more transmitter devices (e.g., one or more ultra-wide band (UWB) radio transmitters), one or more feedback devices (e.g., a light emitting diode, a speaker, a haptic feedback device, etc.), one or more user input devices, and one or more batteries. In some embodiments, the user devices 118 may be wearable. By way of example, the user device 118 may be worn by the user via a vest, straps, backpack, or other wearable article.

The user device 118 may be configured to operate in a variety of states (e.g., power on, activate, deactivate, etc.). A user device 118 may include one or more feedback devices each configured to provide any suitable combination of feedback (e.g., haptic feedback, visual feedback, audible feedback) indicating the operational state of the user device 118 and the user devices 118 may be configured to provide an indication of their respective operational state to the workspace management module 102 at any suitable time. Each transmitter device of the user devices 118 may be configured to communicate via one or more communication channels (e.g., WiFi, short-range radio, etc.). By way of example, a transmitter device may include a first antenna for conducting communications via WiFi and a second antenna for conducting communications utilizing short-range radio signals. Although referred to as "transmitter devices," it should be appreciated that each of these devices may be configured to receive data from its corresponding communications channel(s). In some embodiments, each transmitter device may be configured to transmit one or more radio signals having a particular frequency (e.g., 125 kHz, 925 MHz, 433 MHz, etc., or any suitable combination of the above) and a particular range (e.g., 5-7 meters, 25-30 meters, etc.). By way of example, a first radio signal may have a range indicated at 120, while a second radio signal may have a range indicated at 122. In some embodiments, the transmitter devices may be configured to alternate responsibility for transmitting the one or more radio signals according to a predetermined scheme. For example, a first transmitter device may transmit the first and second radio signals for a predetermined time period. At the end of this predetermined time period, the first transmitter device may cease its transmission(s) and the second transmitter device may begin transmitting the one or more radio signals. The transmitter devices may alternate transmission responsibility at any suitable rate (e.g., a set rate, a modulating rate, etc.) and/or according to any suitable predetermined scheme and/or schedule.

The mobile drive units 104 may each be configured with one or more receiver devices configured to receive radio signals transmitted by the user devices 118. In some embodiments, the mobile drive units 104 may be configured to slow when a particular frequency signal (e.g., a 925 MHz signal)

is received. Similarly, the mobile drive units may be configured to stop when a different frequency signal (e.g., a 125 kHz signal) is received. The mobile drive units 104 may provide (e.g., to the workspace management module 102) an indication that a particular frequency signal has been received by the mobile drive units 104. This information may be provided at any suitable time and in any suitable manner. In some embodiments, the indication that a particular radio signal has been received may be provided along with or separate from navigational information indicating, among other things, a location, a speed of the mobile drive unit, or the like. The mobile drive units 104 may be configured with one or more feedback devices (e.g., one or more LED lights, one or more speakers, etc.) that indicate when the mobile drive unit is receiving a radio signal (e.g., a particular radio signal). By way of example, a feedback device of the mobile drive unit 104-1 may present a yellow light while the MDU receives a 925 MHz (or 433 MHz) signal and a red light while the MDU receives a 125 kHz signal. In some embodiments, the mobile drive unit 104-1 may present a blue (or another) colored light when receiving the 925 MHz (or 433 MHz) signal and/or the 125 kHz signal. The color of the light provided may vary. In some embodiments, the light may be solid or blinking. A speaker of the mobile drive units 104 may similarly be utilized to present an audible indication indicating that a particular signal is being received.

While the appropriate components of inventory system complete assigned tasks, the workspace management module 102 may interact with the relevant components (e.g., the mobile drive units 104, the operators, the user device 118, etc.) to ensure the efficient use of the resources available to inventory system. As one specific example of such interaction, workspace management module 102 is responsible, in particular embodiments, for planning the paths and managing the speed the mobile drive units 104 utilize when moving within the workspace 110 and for allocating use of a particular portion of the workspace 110 to a particular mobile drive units 104 for purposes of completing an assigned task. In such embodiments, the mobile drive units 104 may, in response to being assigned a task, request a path to a particular destination associated with the task.

Components of the inventory system (e.g., the mobile drive units 104, and/or the computing devices associated with the operators, and/or the user device 118) may provide information to the workspace management module 102 regarding their current state, navigational data, other components of the inventory system with which they are interacting, and/or other conditions relevant to the operation of the inventory system. This may allow the workspace management module 102 to utilize feedback from the relevant components to update algorithm parameters, adjust policies, or otherwise modify its decision-making to respond to changes in operating conditions or the occurrence of particular events.

In addition, while the workspace management module 102 may be configured to manage various aspects of the operation of the components of the inventory system, in particular embodiments, the components themselves may also be responsible for decision-making relating to certain aspects of their operation, thereby reducing the processing load on the workspace management module 102.

Thus, based on its knowledge of the location, current state, and/or other characteristics of the various components of the inventory system and an awareness of all the tasks currently being completed, the workspace management module 102 can generate tasks, allot usage of system resources, and otherwise direct the completion of tasks by the individual components in a manner that optimizes operation from a system-wide perspective.

Access to the workspace 110 may be controlled via one or more access points (e.g., access points 109). Each access point may include a physical barrier device (e.g., barrier device 112, such as a door, a gate, or as depicted, a light curtain). By default, the physical barrier device 112 may operate in a state in which access to the workspace 110 is blocked. If the access point is used for both ingress and egress, the access point may allow egress at any suitable time. That is, egress from the workspace 110 may not be blocked by default.

In some embodiments, user devices 118 may initially be deactivated. In some embodiments, while in a deactivated state, the user devices 118 (e.g., user device 118-1) may periodically broadcast respective identification information (e.g., an identifier that uniquely the user device) via one or more transmitters of the user device. In some embodiments, the identification information may be provided (e.g., via WiFi, etc.) by another user device (e.g., a handheld device such as a tablet or smartphone, a stationary computing station, not depicted). By way of example, a user may carry a tablet with which input may be entered to indicate a planned path for the user device 118-1 and/or access point (e.g., 109-1) at which the user plans to gain entry to the workspace 110. An access control unit (not depicted) may receive the identification information for the user device 118-1 from the user device 118-1 via its transmission and/or from the user device with which the planned path was entered. In some embodiments, the planned path may be transmitted by the user device with which it was entered and provided to the workspace management module 102, which in turn may transmit the information to the access point 109-1.

To activate a user device (e.g., user device 118-1), a feedback device (e.g., a light emitting diode) of the user device may be positioned at a receiving device of the access point 109-1. In some embodiments, the feedback device may be configured to transmit data associated with the user device 118-1 (e.g., identification information that uniquely identifies the user device 118-1). In some embodiments, this data is transmitted by modulating light emitted from the feedback device. The data may be received by the receiving device (e.g., a computing device configured to receive light signals). The access control unit of access point 109-1 may verify whether the previously received information (e.g., the identification information received from the user device 118-1, or from the workspace management module 102, or from another user device with which the planned path was entered, etc.) matches the identification information received from the feedback. As additional identification information may be received from other user devices (e.g., user device 118-2), the identification information received at the receiving device can be used to differentiate which user device is requesting activation and/or access. If the data does not match, the access control unit may be configured to deny access (e.g., keep a locked door locked, maintain a light curtain, etc.). If the identification information provided at the receiving device matches the previously received identification information, the access control unit may perform operations for requesting activation of the user device 118-1 and/or for enabling access to the workspace via access point 118-1. By way of example, the access control unit may transmit the identification information of the user device (e.g., a user device identifier uniquely identifying the user device 118-1), an access point identifier uniquely identifying the access point, or any suitable information related to the pending access and/or the operational status of the user device 118-1. The workspace management module 102 may be configured to perform operations for verifying that one or more components of the user device are operating correctly. In some embodiments, the workspace management module 102 may communicate directly (e.g., via WiFi) with the user device 118-1 to exchange any suitable information with which the operational status of the components of the user device 118-1 may be ascertained. If the workspace management module 102 determines that the user device 118-1 is operating correctly (e.g., according to a number of predefined rules), the workspace management module 102 may transmit (e.g., to the access control unit of access point 109-1, to the user device 118-1, etc.) an indication that the user device 118-1 has been activated. In some embodiments, the workspace management module 102 may transmit to the user device 118-1 information to indicate to the user device 118-1 that is active.

Upon receiving this information, the user device 118-1 may present an indication (e.g., via the feedback device) that the user device 118-1 has been activated. By way of example, the feedback device (e.g., a LED) may present a feedback light signal (e.g., a solid green light, a blinking light, etc.). This feedback light signal may be separate and distinct from the light used to transmit the identification information (referred to herein as a "verification light signal"). For example, the feedback light signal may be modulated at a different rate and/or pattern than the verification light signal. In some embodiments, the feedback light signal and its modulation rate and/or pattern may be visible to the human eye while the verification light signal may be at a rate and/or pattern that is not perceptible by the human eye.

Upon receiving the indication that the user device 118-1 has been activated, the access control unit at access point 109-1 may execute any suitable operations for allowing access to the workspace 110. By way of example, the access control unit may communicate with one or more actuators at the access point 109-1 to unlock a door, gate, or other physical barrier. As another example, the access control unit may execute operations for deactivating a light curtain or deactivating an alarm system associated with a light curtain. The user may then enter the workspace 110 with the user device 118-1.

An activated user device (e.g., user device 118-3) may modify movements of various components within the workspace. By way of example, the user device 118-3 may have been previously activated prior to entering the workspace 110 in the manner described above. While operating in an activated state, the user device 118-3 may transmit, utilizing a first transmitter device, a first signal (e.g., a first radio signal) corresponding to a first range as indicated at 120. While operating in the activated state, the user device 118-3 may transmit, utilizing a second transmitter device, a second signal (e.g., a second radio signal) corresponding to a second range as indicated at 122. The mobile drive unit 104-2 may be travelling along a planned path 124 corresponding to a task that was previously assigned by the workspace management module 102.

At location 126, the mobile drive unit 104-2 may begin receiving the first signal from the wearable user device 118. Based at least in part on receiving the first signal, the mobile drive unit 104-2 may be configured to slow its speed (e.g., to a speed corresponding to predetermined reduced speed or to a speed at or less than a predetermined threshold). In some cases, the mobile drive unit 104-2 may provide a visual and/or audible indication that it is in receipt of the first signal. Further, the mobile drive unit 104-2 may provide navigational information and/or state information to the workspace management module 102 indicating, at least, its current location, speed, and/or state indicating that it is currently receiving the first signal.

The mobile drive unit 104-2 may continue traversing its planned path 124 until it reaches location 128. At location 128, the mobile drive unit 104-2 may begin receiving a second signal from the user device 118-3. Based at least in part on receiving the second signal, the mobile drive unit 104-2 may be configured to stop motion. In some cases, the mobile drive unit 104-2 may provide a visual and/or audible indication that it is in receipt of the second signal. Further, the mobile drive unit 104-2 may provide navigational information and/or state information to the workspace management module 102 indicating, at least, its current location, speed, and/or state indicating that it is currently receiving the second signal.

Subsequently, the operator of the user device 118-3 may move to a location 130. As the user device 118-3 is moved away from the mobile drive unit 104-2 located at location 128, the mobile drive unit 104-2 may no longer receive the second signal. In some embodiments, the mobile drive unit 104-2 may continue traversing along the planned path 124. Should the mobile drive unit 104-2 still be receiving the first signal from the wearable user device 118, the traversal may be at a reduced speed (e.g., a speed corresponding to predetermined reduced speed and/or a speed at or less than a predetermined threshold). When the mobile drive unit 104-2 is no longer in receipt of the first signal, the mobile drive unit 104-2 may be configured and/or instructed to increase its speed (or resume traveling at its intended speed) to perform its assigned task. The mobile drive unit 104-2 may provide navigational information and/or an indication of an operational state of the mobile drive unit and/or an indication of one or more signals currently being received at any suitable time (e.g., at a set periodicity, at change to an operational parameter such as speed, etc.).

In some embodiments, initial activation of the user device 118-3 may trigger a fault detection process performed by the workspace management module 102 to monitor the connections and/or state of the transmitter devices of the user device 118-3. The workspace management module 102 may be configured to receive fault indications from any suitable transmitter device. Should the workspace management module 102 detect a fault associated with one or more transmitter devices (e.g., by detecting one or more transmitter devices are no longer connected to a wireless network associated with the workspace 110, by receiving a fault indication from a transmitter device, etc.), the workspace management module 102 may be configured to transmit a stop command to any suitable number of the mobile drive units 104 (e.g., any/all of the mobile drive units 104) to cause the receiving mobile drive units to halt motion. The stop command may be addressed to particular mobile drive units and/or the stop command may be broadcasted to all of the mobile drive units 104. In some embodiments, the stop command may not be transmitted until a predetermined time period (e.g., 120 seconds, 160 seconds, five minutes, etc.) has elapsed by which the fault has not been resolved.

In some embodiments, access points 109 may be utilized at any suitable time to enable users to exit the workspace 110 with their respective user device(s) (e.g., user device 118-3). An indication (e.g., a light, an audible alarm, etc.) may be provided at access point utilized for exiting the workspace 110 to remind the user to deactivate his user device (e.g., user device 118-3). The indication (herein referred to as "a deactivation reminder" or "a deactivation indication") may be triggered based at least in part on input received at the access point. For example, pressing a button at the access point, pressing against a push bar of a door of the access point, passing through one or more light curtains, and the like may be used to trigger the deactivation reminder. As a non-limiting example, the access point may include two or more light curtains. In this scenario, the user device may be identified as exiting the workspace 110 based at least in part on an order by which the light curtains are breached. In some embodiments, the user may position the feedback device at the receiving device of the access point (e.g., a receiving device positioned at a location outside the workspace 110) to once again provide its identification information (e.g., via LED modulations). The access control unit may transmit the received identification information to the workspace management system 102. The workspace management system 102 may perform any suitable number of operations to determine whether the user device is to be deactivated based at least in part on a number of predefined conditions. If the workspace management module 102 determines the user device is to be deactivated, the management system may transmit deactivation information (e.g., a deactivation indicator) to the user device (e.g., user device 118-3) to cause the user device to deactivate. In a deactivated state, the user device no longer transmits data that would cause MDUs in the workspace to modify their movements.

Figure 2:
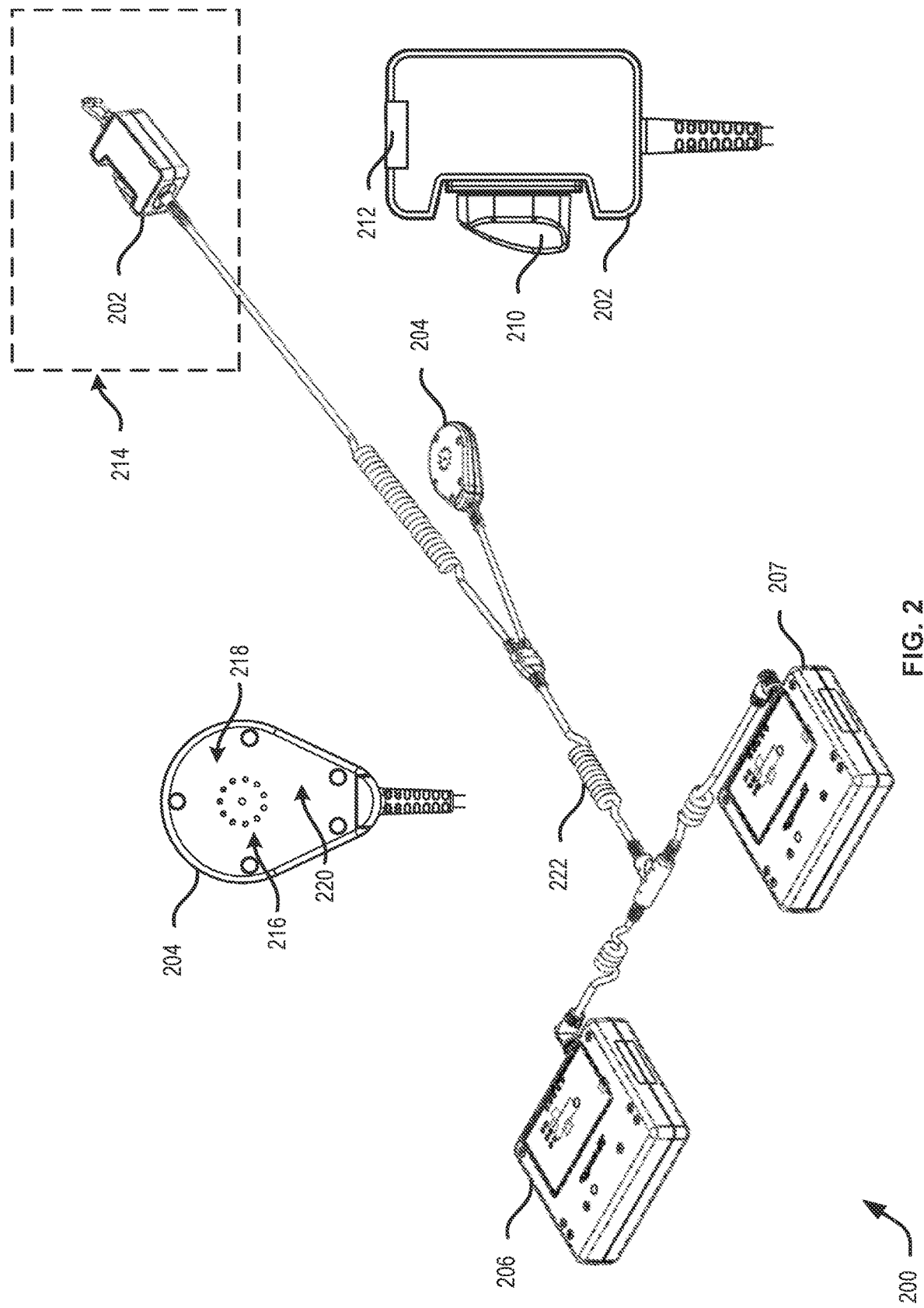
FIG. 2 illustrates example components of a user device, in accordance with at least one embodiment.

FIG. 2 illustrates example components of a user device 200, in accordance with at least one embodiment. The user device 200 may be an example of the user devices 118 of FIG. 1. The user device 200 may include one or more user input device(s) (e.g., the user input device 202), one or more feedback device(s) (e.g., feedback device 204), one or more transmitters (e.g., the transmitter device 206, the transmitter device 207, etc.), or any suitable combination of the above. It should be appreciated that, in some embodiments, one or more user input device(s) and one or more feedback device(s) may be combined into a single component of the user device 200, such that that component may collect user input and/or provide feedback at the same component.

In the embodiment depicted in FIG. 2, the user device 200 includes user input device 202. A user input device (e.g., the user input device 202) may include any suitable user interface elements. By way of example, the user input device 202 may include a knob, a button, a keypad, a rotatable switch, a touch screen, or the like with which user input may be provided. In some embodiments, to enable manual modification of the operational state of the user device 200, the user input device 202 may include a rotational switch (e.g., rotational switch 210), buttons, or other physical input devices. In some embodiments, the physical input devices may be manipulated in a manner corresponding to an action and/or an operational state. By way of example, the rotational switch 210 may rotated in a counter-clockwise fashion for a period of time (e.g., 1 second, 2 seconds, etc.) to indicate a power on action corresponding to powering on the user device 200. As another example, once powered on, the rotational switch 210 may be rotated clockwise for a predetermined amount of time (e.g., 2 second, three seconds, etc.) to indicate an activate action corresponding to activating the user device 200. Once the user device 200 has been activated, the rotational switch 210 may be rotated clockwise for a predetermined amount of time (e.g., three seconds, four seconds, a time period different than the time period associated with the activate action, etc.) to indicate a deactivate action corresponding to deactivating the user device 200. It should be appreciated that the particular manner with which the user input device is manipulated and/or the particular user input (e.g., keystrokes, button selections, etc.) utilized to indicate a corresponding action may vary.

In the example depicted in FIG. 2, user input device 202 may also include a feedback device 212. The combination of the user input device 202 and the feedback device 212 may collectively be referred to as the component 214. In some embodiments, the feedback device 212 may include any suitable feedback device configured to provide visual, audible, and/or haptic feedback. For example, the feedback device 212 may include one or more LED lights for providing visual feedback. In some embodiments, the LED lights may provide any suitable color and/or pattern associated with a particular operational state of the user device 200. In some embodiments, the LED lights may be modulated and/or transmitted at any suitable frequency, rate, and/or pattern to provide one or more light signals that indicate an operational status of the user device 202 and/or to provide any suitable data related to the user device 202 (e.g., an identifier that uniquely identifies the user device 202). In some embodiments, the feedback device 212 may be configured to transmit both types of light signals (indicating operational status and identity). In some embodiments, the transmission of these signals may be offset in a manner that transmission of one does not interfere with the transmission of the other. In some embodiments, the light signals used to indicate operational status are visible while the light signals used to provide identification information are not perceptible to the human eye.

In some embodiments, the user input device 202 may include attachment mechanism (not depicted). By way of example, the attachment mechanism 215 may include a carabiner, a hook, a belt, a button, or any suitable means for attaching the user input device 202 (component 214) to a wearable article (e.g., a vest, a shirt, a coat, a hat, pants, etc.). An example of such an article will be described further in connection with FIG. 3.

In some embodiments, the user device 200 may include feedback device 204. In some embodiments, the feedback device 204 may include a speaker 216, a haptic feedback device 218, and/or a visual feedback device 220. For example, the feedback device 204 may include a visible LED light, an audible intelligible speaker to generate sound, and a vibrating eccentric motor for providing haptic feedback. In some embodiments, feedback device 204 may be contained in a zippered semi-transparent pouch that is configured to mount to a wearable article (e.g., the wearable article 300 of FIG. 3). In some embodiments, the visual feedback device 220 includes at least one LED coupled to a silicone light diffuser to cause the feedback device 204 to glow and be equally visible from all viewing angles. Similar to the feedback device 212, the visual feedback device 220 may be utilized to provide visual feedback corresponding to an operational state of the user device 200. The visual feedback may be any suitable color and/or pattern associated with a particular operational state of the user device 200. In some embodiments, the visual feedback provided by the visual feedback device 220 may correspond to the visual feedback provided at the feedback device 212 (e.g., a light signal indicating an operational status of the user device 200). The speaker 216 may provide audible feedback corresponding to an operational state of the user device 200. Particular audible feedback associated with operational states of the user device 200 may vary in pitch, duration, and/or patterns such that one audible feedback is distinguishable from other audible feedback and identifiable as being related to a particular operational state. The haptic feedback device 218 may provide, via a haptic transducer, haptic feedback corresponding to an operational state of the user device 200. Particular haptic feedback associated with operational states of the user device 200 may vary in frequency, strength, duration, and/or pattern such that one haptic feedback is distinguishable from other haptic feedback and may be identifiable as being related to a particular operational state.

In some embodiments, the user device 200 may include one or more transmitter devices (e.g., transmitter devices 206 and 208). Transmitter devices 206 and 208 may each include one or more ultra-wide band radio transmitters. In some embodiments, the transmitter device 206 and the transmitter device 207 may each be preconfigured to transmit one or more radio signals at one or more frequencies (e.g., 125 kHz, 925 MHz, 433 MHz, etc., or any suitable combination of the above). In some embodiments, the one or more radio signals may include identification information corresponding to the user device 200 (e.g., an identifier that uniquely identifies the user device 200 and/or distinguishes the user device 200 from other user devices). In some embodiments, one signal transmitted by transmitter device 206 and/or the transmitter device 207 may have a shorter range than another signal transmitted by the same device. Each of the transmitter devices may include a wireless antenna (not depicted) for communication with the workspace management module 102 of FIG. 1 via a wireless communications protocol (e.g., WiFi). In some embodiments, the transmitter device 206 and/or the transmitter device 207 may include a battery (not depicted) that may be utilized to provide power to the various components of the user device 200 (e.g., the component 214, the feedback device 204, the transmitter devices 206 and/or 208) directly, or via power cable 222.

The transmitter device 206 and the transmitter device 207 may each be configured to monitor its internal components for errors/faults as well as monitoring the other transmitter for errors/faults. In some embodiments, the transmitter device 206 and the transmitter device 207 may be configured to alternate between transmitting the one or more radio signals and monitoring the transmission of the one or more radio signals by the other transmitter device. By way of example, a first transmitter device may transmit one or more radio signals at particular frequencies (e.g., 125 kHz, 925 MHz, 433 MHz, or any suitable combination of the above). While the first transmitter device is transmitting, a second transmitter device may be configured to monitor the transmissions of the first transmitter device. Should the second transmitter device fail to detect one or more of the expected transmissions of the first transmitter device, the second transmitter device may be configured to an indication of the fault to a remote computer (e.g., the workspace management system 102 of FIG. 1). The first transmitter device and the second transmitter device can be configured to alternate between transmitting the radio signal(s) and monitoring the transmission(s) of the other transmitter device in accordance with a predetermined scheme. For example, the transmitter devices may be configured to alternate between transmission and monitoring functions upon a predetermined schedule and/or according to a predetermined periodicity (e.g., every 250 ms). It should also be appreciated that each of the transmitter devices may be configured to monitor its corresponding components for errors/faults and transmit an indication of such errors/faults to the management system.

While manual activation may be allowed, in some embodiments, manual deactivation may be restricted. That is, while the user may take manual actions to activate the device, once activated, the device may not be manually deactivated by manipulating various physical components of the computing device. Instead, the user may be required to perform operations discussed as part of the flow of FIG. 10. For example, to deactivate the computing device, the feedback device 212 may be used at a receiving device to transmit identification information with which deactivation may be initiated. In some embodiments, no other action taken at the computing device may initiate deactivation of the device. This may ensure that a user may not deactivate a previously activated device while the device is within the workspace (e.g., workspace 110 of FIG. 1).

FIGS. 3A and 3B illustrates schematic diagrams depicting alternate views of a wearable article 300 configured to receive the user device 200 of FIG. 2, in accordance with at least one embodiment. FIG. 3A depicts a front view of the wearable article 300, while FIG. 3B depicts a side view of the wearable article 300. As depicted, the wearable article 300 is a vest. However, it should be appreciated that the wearable article may be in any suitable form (e.g., a shirt, a coat/jacket, or the like).

As depicted in FIG. 3A, the wearable article 300 may include two shoulder straps 302 and 304. Shoulder straps 302 and 304 may be connected to one another as depicted at 306 of FIG. 3B. A chest strap 308 may connect shoulder straps 302 and 304 from a front side of the wearable article 300 as depicted in FIG. 3A. The chest strap 308 may include a bucket and may be adjustable to increase and/or decrease a distance between the shoulder straps 302 and 304 when worn by a user. The wearable article 300 may further include a belt 310. The belt 310 may attach to the shoulder straps 302 and 304 and the shoulder straps 302 and 304 may individually be adjustable to lengthen or shorten to fit a torso area of the user. The belt 310 may also include a buckle 312 and may be adjustable to tighten or loosen the belt 310 around a waist area of the user when worn.

In some embodiments, the belt 310 may be attached to a pouch 314 and a pouch 316. The pouch may be zippered as depicted, or may have alternative closing mechanisms (e.g., Velcro©, buttons, etc.). Each of the pouches 314 and 316 may be configured to receive a transmitter device (e.g., the transmitter device 206 or the transmitter device 207 of FIG. 2). The placement of the pouches 314 and 316 may distribute weight of the transmitter devices 206 and/or 208 such that the weight of the user device 200 of FIG. 2 is evenly distributed over the wearable article 300.

In some embodiments, the wearable article 300 may include an attachment mechanism such as loop 318 and loop 320. The loop 318 and the loop 320 may individually be configured to attach to the user input device 202 of FIG. 2 (also referred to as component 214 of FIG. 2) via the attachment mechanism 215 of FIG. 2. As depicted in FIG. 2, the user device 200 may include an attachment mechanism (e.g., a carabiner) that may attach to either the loop 318 or the loop 320 to position the user input device 202 (or component 214) at a chest area of the user when wearing the wearable article 300. A carabiner and loop are used for illustrative purposes only, it is contemplated that a different attachment component may be utilized to attach the user input device 202 (component 214) to the wearable article 300.

In some embodiments, the feedback device 204 of FIG. 2 may be attached to a back of the wearable article as depicted at 322 of FIG. 3B. The feedback device 204 may be attached utilizing any suitable attachment mechanism. By way of example, the feedback device 204 may be contained in a zippered semi-transparent pouch that mounts to the back of the wearable article at 322. Placement of the feedback device 204 may ensure that the wearer can hear audible feedback from a speaker of the feedback device. The speaker (e.g., the speaker 216 of FIG. 2) may be configured to provide sound at a level that is predetermined as optimal given at least the distance from the wearer's ear. Additionally, the placement of the feedback device 204 at 322 may ensure that haptic feedback is felt by the user at a location approximately between the user's shoulder blades. This may provide an optimal location for providing a haptic indication of an operational state of the user device 200 of FIG. 2 without startling and/or annoying the user.

In some embodiments, the power cable 222 may run from the pouches 314 and 316, up the back of the wearable article 300. One segment of the power cable 222 may connect the feedback device 204 to a battery source. Another segment of the power cable 222 may be placed over a shoulder corresponding to loop 318 or loop 320 and may connect the user input device 202 (component 214 to the battery source.

The particular placement of the various components of the user device 200 on the wearable article 300 may increase the wearer's and other observer's awareness of the operational state of the user device 200. By way of example, by placing the feedback device 204 on the back of the wearable article at 322, the feedback device 204 may be easily viewable by other observers and thus, the operational state of the user device 200 may be easily ascertainable by an observer even some distance away from the user device 200. Similarly, the placement of component 214 at the loop 318 or loop 319 may similarly enable the wearer and/or an observer viewing the front of the wearable article 300 to easily ascertain the operational state of the user device 200. The combination of feedback provided via the component 214 and/or the feedback device 204 of FIG. 2 may increase the likelihood that the wearer is aware of the operational state of the user device 200. This may reduce frustration of the wearer/operator, as well as reduce operator error when operating the user device 200. Additionally, or alternatively, the combination of feedback provided at the user device 200 may decrease the likelihood that a wearer/operator enters the workspace 110 when the user device 200 is operating in a state other than an activated state.

Figure 4B:
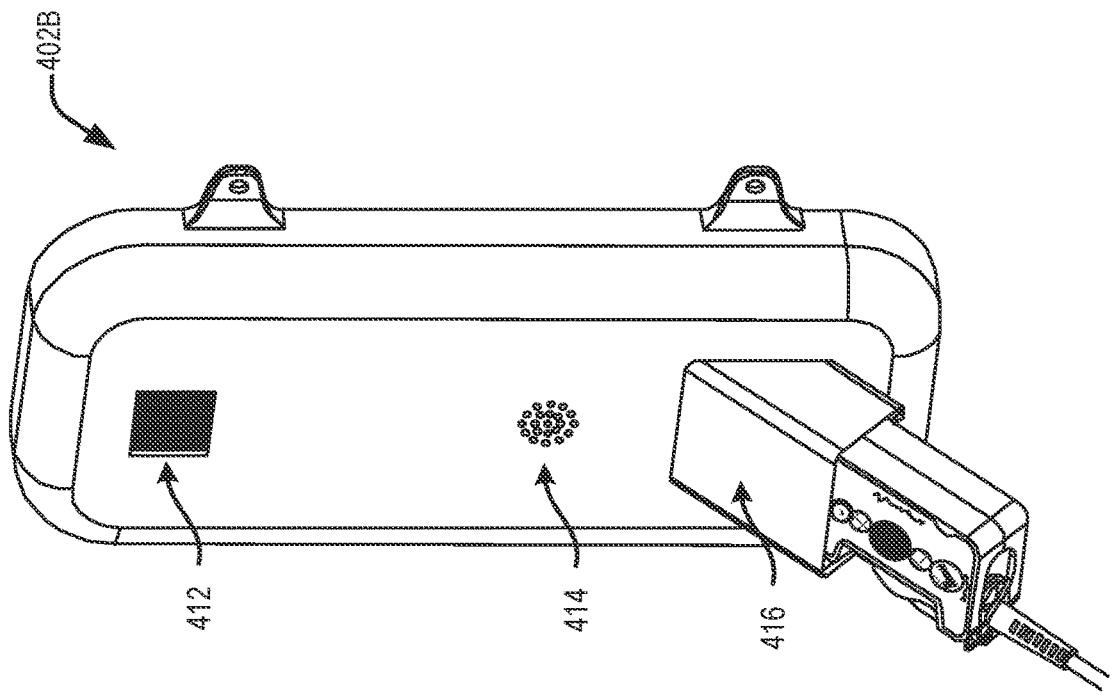
FIGS. 4A and 4B illustrates schematic diagrams depicting two examples of an access point interface, in accordance with at least one embodiment.
Figure 4A:
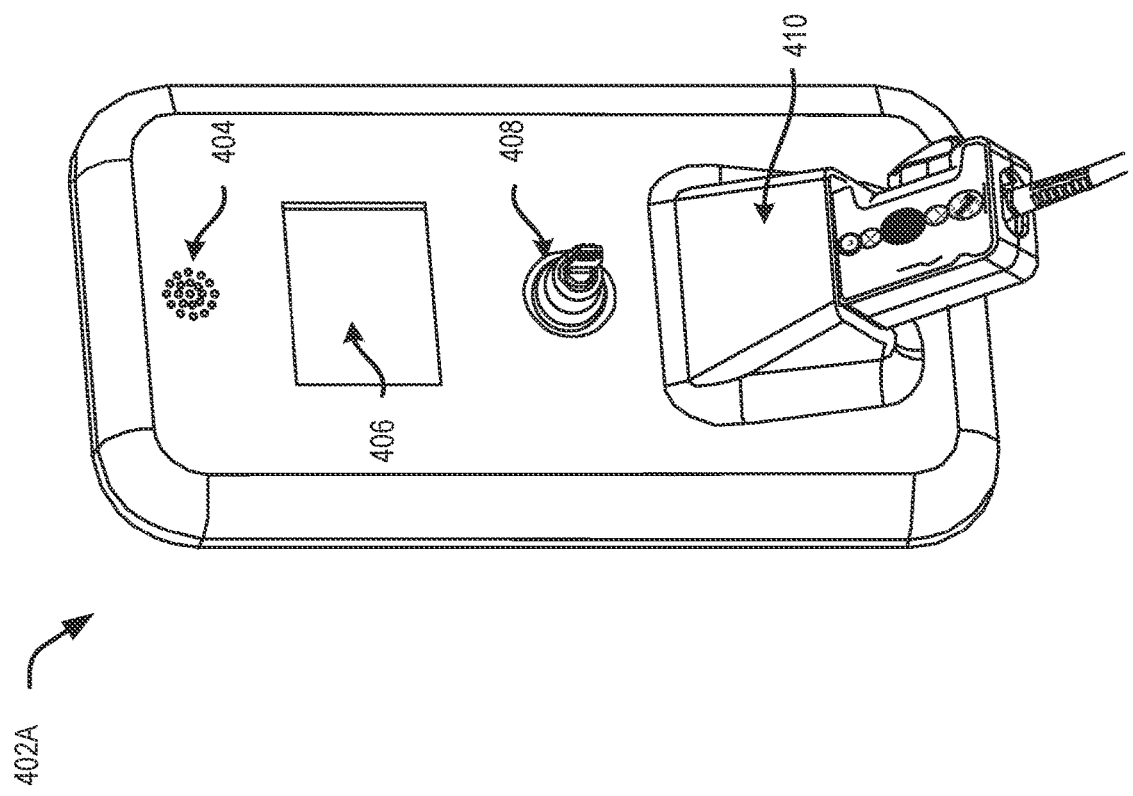

FIGS. 4A and 4B illustrates schematic diagrams depicting two examples of an access point interface (e.g., an interface of the access point 109-1 of FIG. 1), in accordance with at least one embodiment. Interfaces 402A and/or 402B may include any suitable number of input/output devices. By way of example, interface 402A may include a speaker 404, display 406, input device 408, and receiving device 410. Interface 402B, as depicted, includes display 412, speaker, 414, and receiving device 416. Speakers 404 and/or 412 may be configured to provide any suitable audible feedback to indicate any suitable condition at a corresponding access point. For example, audible feedback may be provided via speakers 404 and/or 412 to indicate access has been granted or denied at the access point. As another example, audible feedback may be provided at speakers 404 and/or 412 to indicate input at receiving devices 410 or 416 has been received and/or is needed.

In some embodiments, displays 406 and/or 412 may be configured to provide any suitable visual information to indicate any suitable condition at a corresponding access point. For example, visual information may be provided via displays 406 and/or 412 to indicate input is needed at the access point and/or that the receiving devices 410 and/or 416 are ready to receive input. As another examples, displays 406 and/or 412 may be utilized to present visual information indicating that access has been granted or denied at the access point. As another example, visual information may be provided/presented at displays 406 and/or 412 to indicate input at receiving devices 410 or 416 has been received.

In some embodiments, an access point may include an input device (e.g., input device 408) for modifying the operational status of the access point. In some embodiments, the input device 408 (depicted as a switch in this example) may be utilized (e.g., turned), to transition the access point to a different state (e.g., a maintenance state in which maintenance of components at the access point may be performed without blocking access to the workspace and/or requiring verification of a user device to enable physical barriers to be moved and/or manipulated). In the example depicted, the input device 408 may be keyed such that a key must be inserted into the switch in order to manipulate the input device 408 to trigger the state transition.

Figure 5:
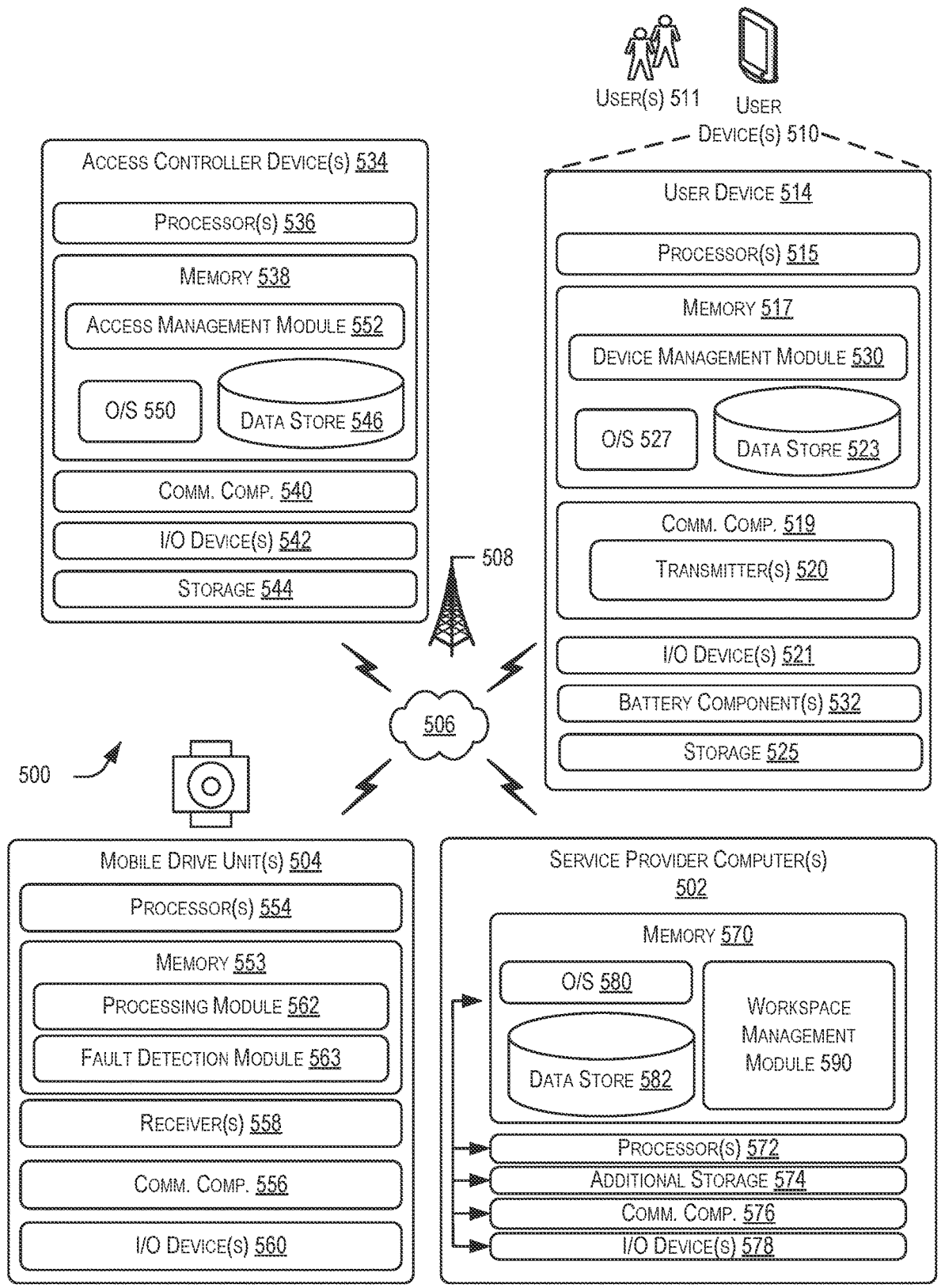
FIG. 5 is an example system architecture for an inventory system, in accordance with at least one embodiment.

FIG. 5 is an example system 500 for implementing aspects of the inventory management system depicted in FIG. 1, in accordance with at least one embodiment. System 500 may be an example of the inventory management system 100 of FIG. 1. System 500 may include any suitable combination of service provider computer(s) 502, mobile drive unit(s) 504 (MDU(s) 104 of FIG. 1), user device(s) 510, (e.g., handheld devices, user device(s) 118 of FIG. 1, etc.), and access controller device(s) 534 (e.g., access controller devices corresponding to the access points 109 of FIG. 1). In some embodiments, the service provider computer(s) 502 may support an electronic marketplace (not shown) and interface with purchase and delivery services of the electronic marketplace. In this manner, the service provider computer(s) 502 may coordinate receiving, storing, packaging, and shipping of items in a warehouse operated by, or on behalf of, the electronic marketplace provider. In some examples, the service provider computer(s) 502 may be a stand-alone service operated on its own or in connection with an electronic marketplace.

In some embodiments, service provider computer(s) 502, MDU(s) 504, user devices 510 (e.g., a handheld user device, user devices 118 of which user device 514 is an example, etc.), may communicate via one or more network(s) 506 (hereinafter, "the network(s) 506"). In some embodiments, user device 514 is configured to be a wearable device (e.g., based at least in part on being affixed to the article 300 of FIG. 3, etc.). The network(s) 506 may include any one or a combination of many different types of networks, such as cable networks, the Internet, wireless networks, cellular networks, radio networks, and other private and/or public networks. At least one of the network(s) 506 may be accessible via access device 508. The access device 508 may include any suitable device that act as a transmitter and/or receiver of local area wireless network signals (e.g., "Wi-Fi", Long Term Evolution (LTE), Bluetooth, WirelessHD and WiGig, and Z-Wave).

User device(s) 510 may be operable by one or more users 511 (hereinafter, "the users 511"). The user device(s) 510 may be any suitable device (e.g., portable or non-portable) capable of communicating with the network(s) 506 and operable by the users 511. In some embodiments, at least one of the user device(s) 510 may be handheld, wearable, or stationary, and may include any suitable computing device such as, but not limited to, the user device 202 of FIG. 2, a mobile phone, a smart phone, a personal digital assistant (PDA), a laptop computer, a thin-client device, a tablet PC, a desktop computer, a scanner, or other computing device.

User device(s) 510, including user device 514, may include corresponding processor(s) 515, memory 517, communication component(s) 519 including transmitter(s) 520 (e.g., the transmitters of user device 118 discussed above in connection with FIG. 1, the transmitters 206 and/or 207 of FIG. 2, etc.), I/O devices 521, one or more data stores 523, additional storage 525, an operating system 527, and, in particular embodiments, a device management module 530. In some embodiments, the user device 514 is battery operated and includes battery component(s) 532. The processor(s) 515 may be implemented as appropriate in hardware, computer-executable instructions, software, firmware, or combinations thereof. Computer-executable instruction, software or firmware implementations of the processor(s) 515 may include computer-executable or machine-executable instructions written in any suitable programming language to perform the various functions described. The memory 517 may include more than one memory and may be distributed throughout the user device 514. The memory 517 may store program instructions (e.g., the device management module 530) that are loadable and executable on the processor(s) 515, as well as data generated during the execution of these programs.

Depending on the configuration and type of memory, the memory 517 may be volatile (such as random-access memory (RAM)) and/or non-volatile (such as read-only memory (ROM), flash memory, or other memory). The memory 517 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 517 may include multiple different types of memory, such as static random access memory (SRAM), dynamic random access memory (DRAM), or ROM. Turning to the contents of the memory 517 in more detail, the memory 517 may include an operating system 527 and one or more application programs, modules or services for implementing the features disclosed herein including at least the operator management module 530.

In some examples, the user device 514 may also include additional storage 525, which may include removable storage and/or non-removable storage. The additional storage 525 may include, but is not limited to, magnetic storage, optical disks, and/or tape storage. The disk drives and their associated computer-readable media may provide non-volatile storage of computer-readable instructions, data structures, program modules, and other data for the computing devices.

The memory 517, and/or the additional storage 525, may include volatile or non-volatile, removable or non-removable media implemented in any method or technology for storage of information such as computer-readable instructions, data structures, program modules, or other data. The memory 517 and the additional storage 525 are all examples of non-transitory computer storage media. Additional types of non-transitory computer storage media that may be present in the user device 514 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the user device 514. Combinations of any of the above should also be included within the scope of non-transitory computer-readable media.

The user device 514 may also contain communication component(s) 519 that allow the user device 514 to communicate with a data store, access control units (e.g., access controller device 532 corresponding to a particular access point such as access point 109-1 of FIG. 1), another computing device or server, user terminals and/or other devices via the network(s) 506. By way of example, the communication component(s) 519 may include transmitter(s) 520 which individually may be examples of the transmitter(s) 206 and/or 207 of FIG. 2)

In some embodiments, the one or more transmitter(s) 520 may each be an ultra-wide band (UWB) radio transmitter. In some embodiments, more than one (e.g., two) transmitters may be included in the user device 514. Each transmitter may be preconfigured to transmit one or more radio signals via on or more particular frequencies each associated with a particular range. For example, each of the transmitter(s) 520 may be configured to transmit a first radio signal at a particular frequency (e.g., 925 MHz, 433 MHz, etc.) associated with a particular range and a second radio signal at a different frequency (e.g., 125 kHz) associated with a different range that is less than the range of the first radio signal. In some embodiments, the transmitter(s) may individually include the processor(s) 515, the components of the memory 514 (including the device management module 530), and/or the communication components(s) 519. Accordingly, each transmitter may operate an instance of the device management module 530. In some embodiments, the transmitter(s) 520 may be configured to communicate with one another to exchange operational state information, to coordinate amongst one another with respect to radio signal transmission and/or fault monitoring efforts, and/or to exchange any suitable information associated with the transmitter(s) 520.

The user device 514 may include I/O device(s) 521, such as any suitable combination of input device 202 of FIG. 2, feedback device 212 of FIG. 2, feedback device 220 of FIG. 2, a keyboard, a mouse, a pen, a voice input device, a touch input device, a display, speakers, a printer, or the like.

The user device 514 may include data store 523. The data store 523 may include one or more databases, data structures, or the like for storing and/or retaining information associated with the user device 514 such as any suitable data related to task assignments, instructions, and/or task performance information.

In some embodiments, the device management module 530 may be configured to provide one or more graphical user interfaces at the user device 514 (e.g., via a display of the user device 514). By way of example, the device management module 530 may be configured to provide user interfaces for selecting a user device (e.g., the user device 118-1 of FIG. 1, the user device 202 of FIG. 2, etc.). Selection of the user device may associate the user of the user device used for selection with a particular user device (e.g., user device 118-1) to be used to gain access to the workspace. The association may be maintained at the user device 514 and/or transmitted to and maintained by the service provider computer(s) 502. The device management module 530 may be configured to receive task assignments (e.g., the task assignments 116 of FIG. 1) from the service provider computer(s) 502 (e.g., the workspace management module 590). Any suitable information related to the task assignment may be presented via the I/O device(s) 521. In some embodiments, the device management module 530 may provide one or more user interfaces for collecting any suitable user input such as a planned path of the user, task performance information, or the like. The device management module 530 may be configured to transmit and receive any suitable information from any suitable component of the user device 514, the MDU(s) 504, and/or the service provider computer(s) 502 via the network(s) 506. Any suitable data received, transmitted, and or collected by the user device 514 may be presented at the user device 514 via the I/O device(s) 521 (e.g., via a display and/or speaker of the user device 514).

The user device 514 may also include one or more battery component(s) 532. The battery component(s) 532 may be configured to provide battery power to any suitable combination of the components of the user device 514.

The user device 514 may be configured to communicate with any suitable component of the inventory management system such as the access controller device(s) 534, the MDU(s) 504, and/or the service provider computer(s) 502 via the network(s) 506. The specific functionality of the device management module 450 may be discussed further with respect to FIG. 7.

System 500 may include access controller device(s) 534 that may be configured perform operations corresponding to an access point of the workspace (e.g., an access point of the access points 109 of FIG. 1). The access controller device(s) 534 may include at least one memory 538 and one or more processing units or processor(s) 536. The memory 538 may store program instructions that are loadable and executable on the processor(s) 536, as well as data generated during the execution of these programs. Depending on the configuration and type of the access controller device(s) 534, the memory 538 may be volatile (such as random access memory (RAM)) and/or non-volatile (such as read-only memory (ROM), flash memory, etc.). The access controller device(s) 534 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the access controller device(s) 534. In some implementations, the memory 538 may include multiple different types of memory, such as static random access memory (SRAM), dynamic random access memory (DRAM), or ROM.

In some embodiments, the access controller device(s) 534 may include communication components(s) 540 for communicating with one or more other components and/or devices of the system 500 (e.g., service provider computer(s) 502, one or more barrier devices (e.g., actuators, light curtain emitters/receivers, etc. (not depicted)) that are associated with an access point, etc.) via any suitable wireless protocol (e.g., WiFi, Bluetooth®, Bluetooth Low Energy®, etc.). In some embodiments, a barrier device (not depicted) is enabled to remove a physical barrier (e.g., a door, a gate, a light curtain, etc.) from blocking access to the workspace through the access point. In some embodiments, the access controller device(s) 534 may include any suitable component (e.g., actuators, light emitters, etc.) configured to provide the functionality of a barrier device (e.g., to enable or restrict access to the workspace via manipulating a physical barrier). In some embodiments, the communication component(s) 540 may include one or more receiver(s) for receiving signals (e.g., radio signals) from the one or more transmitter(s) 520 of the user device 514. T In some embodiments, the access controller device(s) 534 may include one or more input/output (I/O) device(s) 542.

The I/O device(s) 542 may include any suitable combination of sensors such as time of flight sensors, imaging devices (e.g., one or more cameras), infrared sensors, thermal sensors, optical sensors, scanners, and the like. In some embodiments, the I/O device(s) 542 may include interfaces 402A and/or 402B of FIGS. 4A and 4B, respectively, or any suitable combination of the input/output devices discussed above in connection with FIGS. 4A and 4B. By way of example, the I/O device(s) 542 may include speaker 404, display 406, input device 408, and/or receiving device 410 of FIG. 4A.

The access management module 552 may be configured to receive and/or transmit any suitable data (e.g., via communication component(s) 540 and/or input/output device(s) 542) related to verifying user device identification information (e.g., identification information of user device 514), transitioning (or causing transition) of an operational state of the user device 514, and/or enabling or restricting access to a workspace via one or more access points (e.g., access point 109-1). In operation, access management module 552 can receive and/or transmit any suitable data to the service provider computer(s) 502 and/or user device(s) 510 at any suitable time. For example, the access management module 552 may receive identification information from the user device(s) 510 and/or the service provider computer(s) 502. In some embodiments, the access management module 552 may receive light signals via I/O device(s) 542 (e.g., light signals emitted by I/O device(s) 521, such as feedback device 212 of FIG. 2).

System 500 may include MDU(s) 504 that may be configured to move within a workspace. In some embodiments, the MDU(s) 504 may each be an example of MDU(s) 104 of FIG. 1. The MDU(s) 504 may include at least one memory 553 and one or more processing units or processor(s) 554. The memory 553 may store program instructions that are loadable and executable on the processor(s) 554, as well as data generated during the execution of these programs. Depending on the configuration and type of the MDU(s) 504, the memory 553 may be volatile (such as random-access memory (RAM)) and/or non-volatile (such as read-only memory (ROM), flash memory, etc.). The MDU(s) 504 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the MDU(s) 504. In some implementations, the memory 553 may include multiple different types of memory, such as static random-access memory (SRAM), dynamic random-access memory (DRAM), or ROM.

In some embodiments, the MDU(s) 504 may include communication component(s) 556 for communicating with one or more other components and/or devices of the system 500 such as the user devices 510 (including the user device 514), and/or the service provider computer(s) 502 via any suitable wireless protocol (e.g., WiFi, Bluetooth®, Bluetooth Low Energy®, etc.). In some embodiments, the MDU(s) 504 may also include one or more receiver(s) 558 for receiving radio signals from the one or more transmitter(s) 520 of the user device 514. The MDU(s) 504 may further include one or more input/output (I/O) device(s) 560. The I/O device(s) 560 may include any suitable combination of sensors such as time of flight sensors, imaging devices (e.g., one or more cameras), infrared sensors, thermal sensors, optical sensors, scanners, and the like. In some embodiments, the I/O device(s) 560 may include feedback devices such as one or more speakers, one or more lights (e.g., LED lights), or the like.

The processing module 562 may be configured to receive and/or transmit any suitable data related to task assignments (e.g., the task assignments 116), space reservation requests, navigational information of the MDU, operational state information of the MDU, movement commands, and/or any suitable data related to operating within the system 500. In operation, processing module 562 can receive and/or transmit any suitable data to the service provider computer(s) 502 at any suitable time. For example, the processing module 562 may receive a task assignment and/or instructions from the workspace management module 590 and may be configured to perform a variety of operations according to the task assignment and/or instructions received. During performance of a task, or at any suitable time, the processing module 562 may be configured to transmit navigational information (e.g., current location, current speed, etc.), sensor data received from the I/O device(s) 560, and/or operational state information (e.g., any suitable data indicating that the MDU is operating in a particular state such as "slow" or "stop," that the MDU is receiving one or more radio signals and/or the corresponding frequencies of the radio signal(s) being received, or the like). The processing module 562 may be configured to detect that the receiver(s) 558 are receiving one or more signals provided by the transmitter(s) 520 of the wearable user device 514. In response, the processing module 562 may be configured to transmit navigational information, operational state information, or any suitable data to the workspace management module 590. In some embodiments, upon detecting that a radio signal(s) corresponding to the transmitter(s) 520 is being received by the receiver(s) 558, the processing module 562 may be configured to indicate the same via one or more I/O device(s) 560. By way of example, receipt of a signal of a particular frequency may cause the processing module 562 to present (e.g., via an LED light and/or a speaker) an indication that a signal of that particular frequency is being received. The particular indications provided by the processing module 562 via the I/O device(s) 560 may vary based at least in part on the frequency of the signal currently being received by the receiver(s) 558.

In some embodiments, each of the MDU(s) 504 may include a fault detection module 563. The fault detection module 563 may be configured to monitor any suitable component of the MDU(s) 504 for error(s) and/or fault(s). By way of example, the fault detection module 563 may be configured to monitor the processor(s) 554, the memory 553, the receiver(s) 558, the communication component(s) 556, and the I/O device(s) 560, or any suitable combination of the above. If an error and/or fault is detected by the fault detection module 563, the fault detection module 563 may transmit data indicating the fault to the workspace management module 590. As a specific, non-limiting example, the fault detection module 563 may monitor the receiver(s) 558 for faults. Upon detecting a fault in at least one of the receiver(s) 558, the fault detection module 563 may transmit any suitable data to the workspace management module 590 indicating the same. In some embodiments, the workspace management module 590 (e.g., the workspace management module 102 of FIG. 1) may be configured to instruct the MDU providing the information to stop (e.g., stop immediately, stop at the next location indicator or a particular location within the workspace, etc.). In some embodiments, the MDU may not return to being controlled by the workspace management module 590 until user input has been received (e.g., by the workspace management module 590) indicating that the MDU has been repaired.

It should be appreciated that the MDU(s) 504 may be configured with multiple instances of the fault detection module 563. In some embodiments, each instance of the fault detection module 563 may correspond to a particular component of the MDU. By way of example, one instance of the fault detection module 563 may correspond to a first receiver of the receiver(s) 558, while another instance of the fault detection module 563 may correspond to a second receiver of the receiver(s) 558. Alternatively, some or all of the components of the MDU(s) 504 may be monitored by a single instance of the fault detection module 563.

The service provider computer(s) 502, perhaps arranged in a cluster of servers or as a server farm, may host web service applications. These servers may be configured to host a website (or combination of websites) viewable via the user device(s) 510. In at least one example, the service provider computer(s) 502 may be configured to manage the MDU(s) 504 as part of an inventory management system. The service provider computer(s) 502 may include at least one memory 570 and one or more processing units (or processor(s)) 572. The processor(s) 572 may be implemented as appropriate in hardware, computer-executable instructions, software, firmware, or combinations thereof. Computer-executable instruction, software or firmware implementations of the processor(s) 572 may include computer-executable or machine-executable instructions written in any suitable programming language to perform the various functions described.

The memory 570 may include more than one memory and may be distributed throughout the service provider computer(s) 502. The memory 570 may store program instructions (e.g., workspace management module 590) that are loadable and executable on the processor(s) 572, as well as data generated during the execution of these programs. Depending on the configuration and type of memory, the memory 570 may be volatile (such as random access memory (RAM)) and/or non-volatile (such as read-only memory (ROM), flash memory, or other memory). The service provider computer(s) 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 570 may include multiple different types of memory, such as static random access memory (SRAM), dynamic random access memory (DRAM), or ROM.

Turning to the contents of the memory 570 in more detail, the memory 450 may include an operating system 580 and one or more application programs, modules or services for implementing the features disclosed herein including at least the workspace management module 590. In some examples, the MDU(s) 504 may individually execute some portion of the workspace management module 590 to operate, at least partially, independent of the service provider computer(s) 502.

In some examples, the service provider computer(s) 502 may also include additional storage 574, which may include removable storage and/or non-removable storage. The additional storage 574 may include, but is not limited to, magnetic storage, optical disks, and/or tape storage. The disk drives and their associated computer-readable media may provide non-volatile storage of computer-readable instructions, data structures, program modules, and other data for the computing devices.

The memory 570 and the additional storage 574, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer(s) 502. The modules of the service provider computer(s) 502 may include one or more components. The service provider computer(s) 502 may also include input/output (I/O) device(s) 578 and/or ports, such as for enabling connection with a keyboard, a mouse, a pen, a voice input device, a touch input device, a display, speakers, a printer, or other I/O device.

In some examples, the I/O device(s) 578 may present one or more user interfaces for interacting with the service provider computer(s) 502. These user interfaces may include graphical user interfaces, web-based applications, programmatic interfaces such as application programming interfaces (APIs), or other user interface configurations. The service provider computer(s) 502 may also include data store 582. The data store 582 may include one or more databases, data structures, or the like for storing and/or retaining information associated with the service provider computer(s) 502 and/or information received from any suitable component of the inventory management system (e.g., the user device 514, the wearable user device 414, the MDU(s) 504) including, but not limited to, navigational information, operational state information, user input provided at a user device (e.g., the user device 514), and the like.

Figure 6:
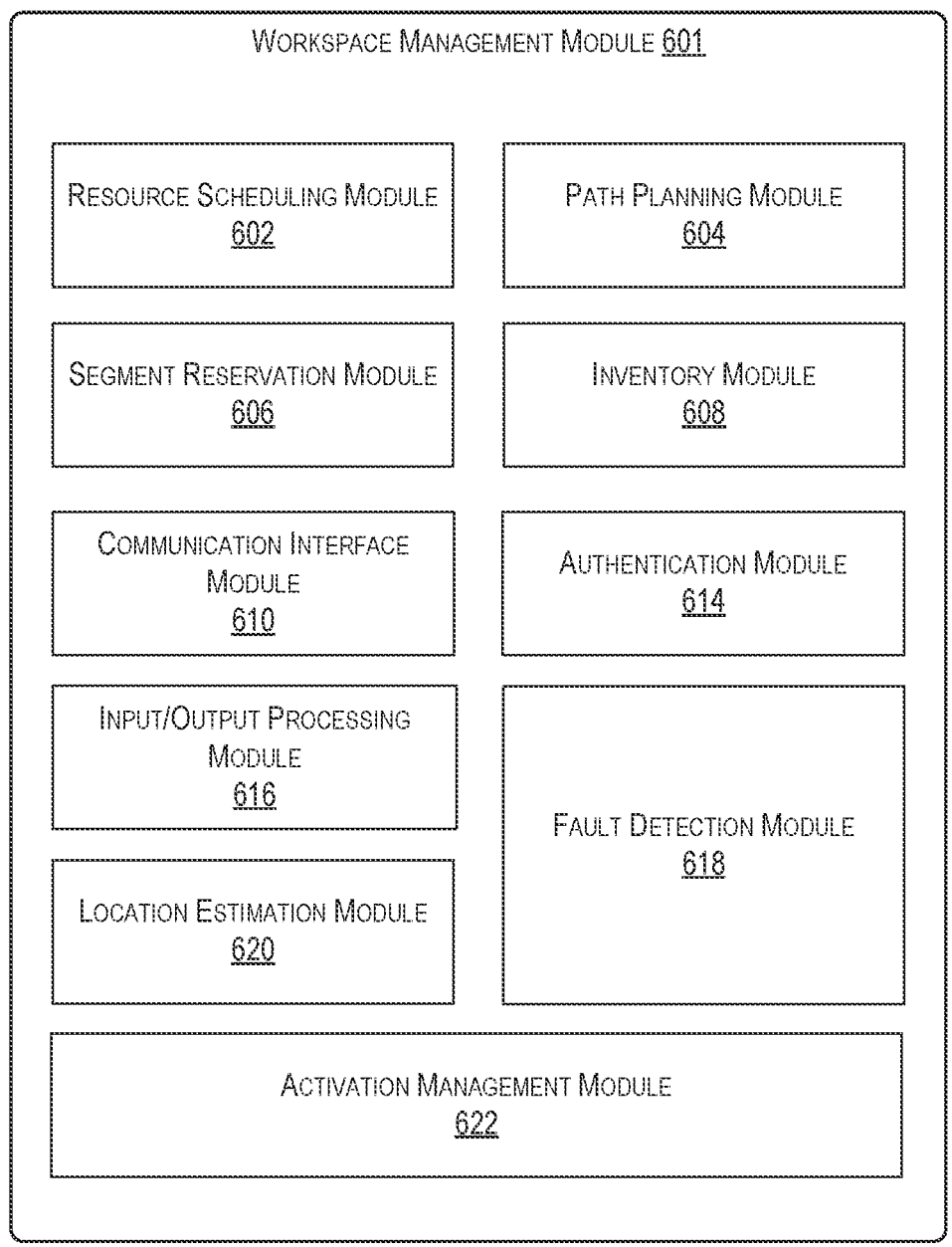
FIG. 6 illustrates in greater detail the components of a particular embodiment of a workspace management module, in accordance with at least one embodiment.

FIG. 6 illustrates in greater detail the components of a particular embodiment of a workspace management module 601 (e.g., the workspace management module 102 of FIG. 1, the workspace management module 590 of FIG. 5. As shown, the example embodiment includes a resource scheduling module 602, a path planning module 604, a segment reservation module 606, an inventory module 608, a communication interface module 610, an authentication module 614, an input/output processing module 616, a fault detection module 618, a location estimation module 620, and an activation management module 622. The workspace management module 601 may represent a single component, multiple components located at a central location within an inventory management system of FIG. 1, or multiple components distributed throughout inventory management system.

In at least one embodiment, the resource scheduling module 602 may be configured to process received inventory requests and generate one or more assigned tasks to be completed by the components of the inventory management system described in the figures above. The resource scheduling module 602 may also select one or more appropriate components (e.g., one or more MDU(s) (e.g., MDU(s) 104 of FIG. 1, MDU(s) 504 of FIG. 5), one or more operators, etc.) for completing the assigned tasks (e.g., movement of a storage container, storage/retrieval of an item, performance of a maintenance task, etc.) and may communicate, via the communication interface module 610, the assigned tasks to the relevant components. In some examples, the resource scheduling module 602 may select the one or more appropriate components based on a location of the component, the capabilities of the component, a current task assignment of the component, and the like.

In at least one embodiment, the path planning module 604 may receive path request(s) from the MDUs. A path request may identify one or more destinations associated with a task (e.g., moving a storage container, storing/retrieving an item within/from a storage container, etc.) the requesting component is tasked with executing. In response to receiving a path request, the path planning module 604 may generate a path to one or more destinations identified in the path request. The path planning module 604 may implement any appropriate algorithms utilizing any appropriate parameters, factors, and/or considerations to determine the appropriate path. After generating an appropriate path, the path planning module 604 may transmit a path response identifying the generated path to the requesting robotic device using the communication interface module 610.

In at least one embodiment, the segment reservation module 606 may receive reservation requests from the MDUs attempting to move along paths generated by the path planning module 604. These reservation requests may indicate a request for the use of a particular portion of the workspace (referred to herein as a "segment") to allow the requesting MDUs efficiently utilize the workspace with respect to other MDUs of the system while moving across the reserved segment. In response to received reservation requests, segment reservation module 606 may transmit a reservation response granting or denying the reservation request to the requesting robotic device using the communication interface module 610.

In at least one embodiment, the inventory module 608 may maintain information about the location and number of inventory items in the inventory management system. Information can be maintained about the number of inventory items in a particular storage container, and the maintained information can include the location of those inventory items in the storage container.

In at least one embodiment, the communication interface module 610 may facilitate communication between workspace management module 601 and other components of inventory management system such as the user device(s) 510 (e.g., the user device 514) and/or the MDU(s) 504 of FIG. 5. These communications may relate to reservation responses, reservation requests, path requests, path responses, task assignments, navigational information, operational state information, and the like. Depending on the configuration of workspace management module 601, communication interface module 610 may be responsible for facilitating either or both of wired and wireless communication between the various components of inventory management system. In particular embodiments, workspace management module 601 may communicate via the communication interface module 610 using communication protocols such as 802.11, Bluetooth, or Infrared Data Association (IrDA) standards. In such embodiments, communication interface module 510 may facilitate communication between workspace management module 102 and other parts of the same system component.

In at least one embodiment, the authentication module 614 may be configured to receive a connection request (e.g., from one or more user devices such as the user device 514). In some embodiments, the authentication module 614 may maintain a mapping for indicating particular transmitter(s) associated with particular user devices (e.g., a mapping indicating transmitter(s) 520, an example of the transmitter(s) 206 and 207 of FIG. 2, are associated with a particular user device (e.g., user device 514). This data may be provided in the connection request or predefined. By way of example, the mapping may indicate that a user device (e.g., associated with an alphanumeric user device identifier) is associated with a first transmitter associated with a transmitter alphanumeric identifier (e.g., "apple") and a second transmitter associated with a transmitter alphanumeric identifier (e.g., "banana"). Upon receiving an activation request, the authentication module 614 may verify that the user device is authorized to connect to the network. In some embodiments, this verification may include determining, from the mapping, that a device identifier of the activation request corresponds to a transmitter associated with a known user device. If the transmitter is authorized to connect, the authentication module 614 may be configured to provide wireless network credentials to the requesting device (e.g., directly, via access controller device(s) 534, etc.) to enable the user device to connect to a wireless network (e.g., a WiFi network) of the inventory management system. In some embodiments, the authentication module 514 may be configured to monitor network connectivity of the transmitters and provide an indication of the network connectivity of one or more transmitters of a user device to the input/output processing module 616 and/or the fault detection module 618. For example, if a wearable user device is associated with two transmitters, the authentication module 614 may detect when both transmitters have WiFi connection and may provide any suitable data to the input/output processing module 616 and/or the fault detection module 618 indicating the same.

In at least one embodiment, activation management module 622 may be configured to receive an activation request from an access control unit (e.g., the access controller device 534 of FIG. 5) and/or a user device (e.g., the user device 514 of FIG. 5). The activation management module 622 may store a mapping between an identifier of the access control unit and an identifier of the user device as received in the request. When received from an access control unit, the activation request may relate to a request activating and/or allowing access of a user device at one or more access points (e.g., access point 109-1). In some embodiments, an activation request received from a user device may relate to a request to activate the user device. The activation management module 622 may be configured with a predefined rule set to indicate one or more conditions for allowing a user device to be activated. By way of example, one rule of the set may specify that one or more transmitters of the user device is known to be operational. In some embodiments, the activation management module 622 may determine operational status of the user device based at least in part on data obtained by the fault detection module 518. If conditions are met to allow activation, the activation management module 622 may be configured to cause data to be transmitted (e.g., via the input/output processing module 616) to the user device pertaining to the activation device (e.g., the user device 514) indicating the request has been granted and/or indicating an instruction to the user device to perform operations for activating the user device (e.g., to begin transmitting the radio signals discussed in connection with FIG. 1 for potentially modifying movements of other components of the system). If the conditions are not met, the activation management module 622 may transmit an activation response (e.g., via the input/output processing module 616) to the device that initiated the activation request (e.g., access controller device 534) indicating the activation request has been denied. In some embodiments, any suitable data related to the activation request may be provided in a response. If the request is denied, a reason code or other indicator indicating a reason why the request was denied may be included in the response and potentially displayed or otherwise communicated (e.g., with a light, a display, and/or speaker) via an interface associated with the access point (e.g., at the interface 402A of FIG. 4A).

The activation management module 622 may be configured to receive (e.g., from the user device previously instructed to activate) an indication (e.g., an activation status message) that a user device has been activated. In some embodiments, the activation management module 622 may consult the previously stored mapping to identify whether an access control unit initially requested the activation. If an identifier of the user device (as received in the activation status message) is associated with an access control unit, the activation management module 622 may transmit (e.g., via the input/output processing module 616) an indication that the user device is active and/or instructions instructing the access control unit to allow access to the workspace via the access point. In some embodiments, the access control unit, upon receipt of this information, may be configured to allow access to the workspace (e.g., based at least in part on causing a physical barrier such as a light curtain, a door, a gate, and the like, to be removed).

In some embodiments, the input/output processing module 616 may be configured to receive and/or transmit any suitable data to a user device (e.g., the user device 514 of FIG. 4) and/or to the access controller device(s) 534. By way of example, upon receiving an indication that all the transmitters of a given wearable user device are connected to a wireless network, the input/output processing module 616 may be configured to provide any suitable data indicating that a particular user device is available for selection. Sending this data may cause a user device (e.g., a handheld user device such as a tablet of user device(s) 510) to provide one or more user interfaces from which the user device (e.g., user device 514) may be selected. The input/output processing module 516 may receive an indication that a particular wearable user device was selected by a user and may maintain an association between the user and the wearable user device.

In some embodiments, the input/output processing module 616 may be configured to receive (e.g., from a handheld user device) planned path data corresponding to another user device (e.g., a wearable user device such as user device 514). In some embodiments, the planned path data may be provided to the path planning module 604 such that paths of one or more MDUs of the system may be altered and/or generated based at least in part on the planned path of the wearable user device. In some embodiments, the input/output processing module 616 may provide the planned path data to the location estimation module 620 and/or store the planned path data in any suitable location accessible to the location estimation module and/or the path planning module 504.

The input/output processing module 616 may be configured to receive operational state information from one or more user devices (e.g., the user device 514 of FIG. 5). In some embodiments, upon receipt operational state information indicating an operational status for user device 514, the input/output processing module 616 may transmit any suitable data to the fault detection module 618 indicating the same.

In some embodiments, the fault detection module 618 may be configured to monitor for faults of one or more transmitters of one or more user devices of the system. In some embodiments, the functionality of the fault detection module 618 may be triggered by receiving an indication (e.g., from the input/output processing module 616) that a particular wearable user device is operating in an activated state (indicating that all transmitters associated with the user device are currently transmitting a signal). Upon receipt, the fault detection module 618 may monitor the network connections associated with each transmitted of the activated user device. In some embodiments, the fault detection module 618 may detect when a transmitter has lost network connection. The fault detection module 618 may further be configured to receive fault indications from any suitable transmitter device (e.g., the transmitter(s) 520 of FIG. 5). These fault indications may indicate a fault associated with the transmitter device providing the indication and/or a fault associated with a different transmitter device than the one providing the indication In some embodiments, the fault detection module 618 may detect a fault associated with one or more transmitter devices based at least in part on monitoring the network connections of the transmitter devices and/or receiving one or more fault indications from one or more transmitter devices. In response to detecting a fault, the fault detection module 618 may immediately cause a stop command to be transmitted to one or more MDUs of the system. Alternatively, the fault detection module 618 may be configured to wait a predetermined time period (e.g., 160 seconds) after detecting the fault before transmitting a stop command. In some examples, the fault detection module 618 may cause a stop command to be transmitted based at least in part on determining that the predetermined time period has elapsed since the transmitter lost network connection, and that the transmitter has not regained network connection. The stop command may be addressed to one or more MDUs and/or the stop command may be broadcasted. Receipt of the stop command by any MDU may cause the MDU to halt motion.

In some embodiments, the fault detection module 618 may detect a fault associated with one or more MDUs (e.g., the MDU(s) 504) of FIG. 5. By way of example, the fault detection module 618 may receive (e.g., from the fault detection module 563 of FIG. 5) an indication that at least one component of an MDU is faulty. In accordance with receiving such data, the fault detection module 618 may be configured to instruct the MDU to stop. In some embodiments, the fault detection module 618 may transmit a stop command to the MDU immediately. In some embodiments, the stop command may cause the MDU to halt motion upon receipt. Alternatively, the stop command may cause the MDU to halt motion when it reaches a next location indicator or a particular location within the workspace.

In some embodiments, the location estimation module 620 may be configured to receive navigational information and/or operational state information from one or more MDUs of the inventory management system. The location estimation module 620 may be configured to estimate a location of a given wearable user device based at least in part on the planned path data associated with the wearable user device and/or the navigational information and/or operational state information received from the one or more MDUs. By way of example, the location estimation module 620 may detect one or more MDUs that are operating at a reduced speed or stopped altogether due to receiving one or more signals from a wearable user device. The location estimation module 620 may consult planned path data of each wearable user device of the system to determine that a particular wearable user device is most likely to be providing the signals affecting the MDUs. The locations, speeds, and/or operational states of the affected MDUs may be utilized to estimate a location of the wearable user device.

The estimated location may be transmitted via the input/output processing module 616 to the handheld user device. Receipt of the estimated location may cause the handheld user device to present an indication of the location of the wearable device at a display of the device.

In general, the resource scheduling module 602, the path planning module 604, the segment reservation module 606, the inventory module 608, the communication interface module 610, the authentication module 614, the input/output processing module 616, the fault detection module 618, the location estimation module 620, and the activation management module 622, may each represent any appropriate hardware and/or software suitable to provide the described functionality. In addition, as noted above, workspace management module 601 may, in particular embodiments, represent multiple different discrete components and any or all of the resource scheduling module 602, the path planning module 604, the segment reservation module 606, the inventory module 608, the communication interface module 610, the authentication module 614, the input/output processing module 616, the fault detection module 618, the location estimation module 620, and/or the activation management module 622 may represent components physically separate but accessible from the remaining elements of workspace management module 601. Moreover, functionality provided by the resource scheduling module 602, the path planning module 604, the segment reservation module 606, the inventory module 608, the communication interface module 610, the authentication module 614, the input/output processing module 616, the fault detection module 618, the location estimation module 620, and/or the activation management module 622 may be provided by fewer modules than those depicted in FIG. 6.

It should be appreciated that although a single workspace management module 601 is depicted in various examples provided herein, more than one workspace management module 601 may be utilized. As a non-limiting example, multiple workspace management modules may be utilized where each workspace management module is configured to manage various components (e.g., MDUs, operators, etc.) in a given area of a workspace (e.g., a sub-area of the workspace 110, a floor of the workspace 110, etc.). Each workspace management module may be configured to communicate with other workspace management modules to exchange operational state information associated with a wearable user device, a location estimation of the wearable user device, fault detection information associated with a wearable user device, or the like. It is also contemplated that a single workspace management module may be utilized to manage multiple sub-areas and/or floors of the workspace 110. In some embodiments, the fault detection module 618 may be configured to detect a lost network connection associated with a particular transmitter device of a wearable user device. Another workspace management module (or the workspace management module 601) may subsequently receive a connection request and/or user input from the wearable user device indicating that the wearable user device has traveled to a different sub-area and/or floor of the workspace 110. Based at least in part on the connection request and/or user input and/or a predetermined time elapsing since the connection in the previous area was lost, the fault detection module 618 may transmit a stop command to one or more MDUs of the previous area. In some embodiments, such as when the user input and/or connection request indicates the wearable user device has traveled to a different area of the workspace 110, the fault detection module 618 may transmit any suitable data to a handheld device (e.g., the user device of the user device(s) 510) associated with the user of the wearable user device (e.g., user device 514) to indicate that a fault is occurring in the previously occupied area. In some embodiments, the user may be instructed to return to the previously occupied area and/or the handheld user device may provide an override mechanism that, when selected, causes the fault detection module 618 to perform one or more operations to recover from the fault (e.g., transmit a resume command to all MDUs in the previously occupied area).

Figure 7:
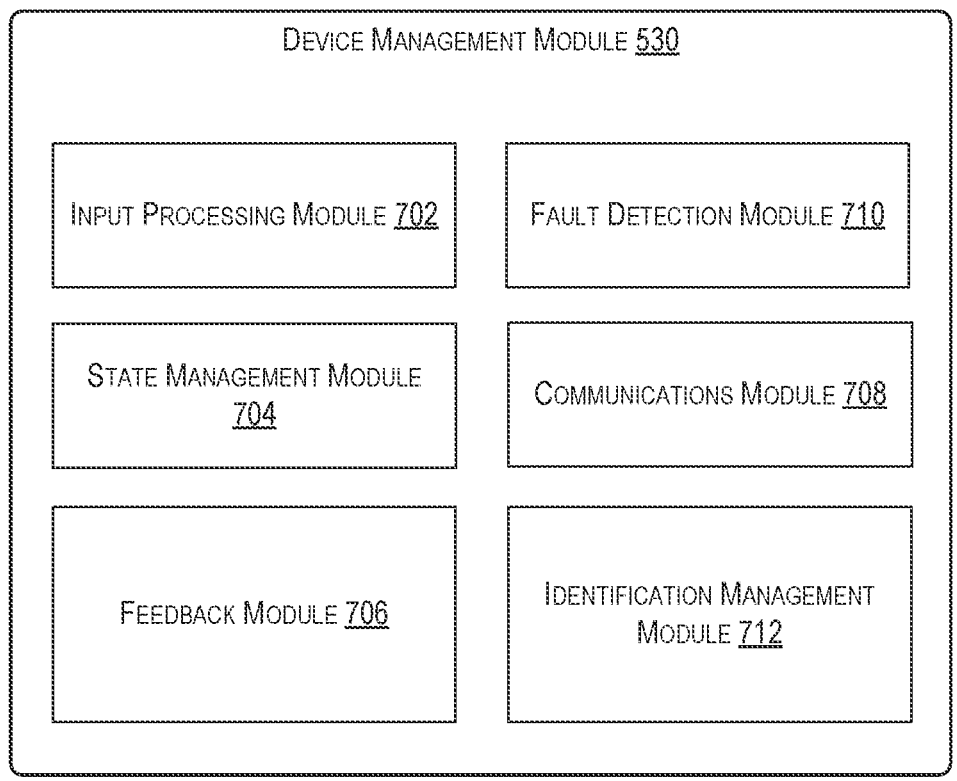
FIG. 7 illustrates in greater detail the components of a particular embodiment of a device management module, in accordance with at least one embodiment.

FIG. 7 illustrates in greater detail the components of a particular embodiment of a device management module 530 of FIG. 5. As shown, the example embodiment includes an input processing module 702, a feedback module 706, a state management module 704, a communications module 708, a fault detection module 710, and an identification management module 712.

In some embodiments, the input processing module 702 may be configured to receive input from one or more user input devices (e.g., the user input device 202 of FIG. 2) and/or from the workspace management module 590 of FIG. 5. In some embodiments, the input processing module 702 may provide the user input to the state management module 704 and/or the feedback module 706 and/or the identification management module 712.

In some embodiments, the state management module 704 may be configured to manage the state of the user device on which the device management module 530 operates (e.g., user device 514 of FIG. 5). In some embodiments, the state management module 704 may be configured to transition the user device to operate in a particular state based at least in part on user input received via the input processing module 702. In some embodiments, the wearable user device has a number of possible operational states (e.g., power on, activate, deactivate, etc.) each operational state being associated with a particular set of operations.

In some embodiments, the state management module 704 may receive user input (e.g., via the input processing module 702) indicating an action to activate the user device. In some embodiments, the user input may correspond to the user moving a knob to a position associated with powering on the wearable user device, although other user input mechanisms may be employed to indicate an action to power on the wearable user device. Upon receiving such input, the state management module 704 may be configured to generate and store operational state information indicating the user device is powering on. In some embodiments, the state management module 704 may be configured to provide the operational state information indicating a power on state to the feedback module 706 and/or a remote system (e.g., the workspace management module 102 of FIGS. 1, 4, and 5).

In some embodiments, the feedback module 706 may be configured to receive user input via the input processing module 702 and/or operational state information from the state management module 704. The feedback module 706 may determine a corresponding feedback indication to be provided via one or more feedback devices of the user device based at least in part on the user input and/or the operational state information indicating a current operational state of the wearable user device. As a non-limiting example, the feedback module 706 may be configured to receive operational state information indicating that the user device is in a power on state. In response, the feedback module 706 may be configured to provide any suitable feedback via one or more feedback devices of the user device to indicate the power on state. For example, one or more audible beeps corresponding to a power on state may be presented via a speaker of the wearable user device. Additionally, or alternatively, one or more LED lights of one or more feedback devices may present a particular color and/or pattern associated with a power on state (e.g., a relatively slow blue blinking light). Additionally, or alternatively, one or more feedback devices may be utilized present haptic feedback (e.g., a vibration) that indicates the power on state of the wearable user device. The particular strength of the vibration and/or the number and/or pattern of vibrations may be unique to the power on state.

In some embodiments, the communications module 708 may be configured to attempt to connect to a network of the inventory management system. By way of example, the communications module 708 may receive (e.g., from the input processing module 702 and/or the state management module 704, or any suitable component of the device management module 530) the user input indicating a power on action and/or an operational state information associated with a power on state. In response to receiving such information, the communications module 708 may be configured to transmit a network connection request (e.g., to the workspace management module 601 of FIG. 6). The communications module 708 may further be configured to receive network credentials (e.g., from the workspace management module 601). Upon receipt of these credentials, the communications module 708 may be configured to connect (e.g., via WiFi, utilizing the communication components 519 of FIG. 5) to a local network.

In some embodiments, the state management module 704 may receive input (e.g., via the input processing module 702) indicating an action to activate the user device. In some embodiments, the input may correspond to the user moving a knob to a position associated with activating the wearable user device, although other user input mechanisms may be employed to indicate an action to activate the wearable user device. In some embodiments, the input indicating the action to activate the user device may be received from the activation management module 622 of FIG. 6 (e.g., via receiving instructions instructing the user device to activate). Upon receiving such input, the state management module 704 may be configured to generate and store operational state information indicating the user device is activated. In some embodiments, the state management module 704 may be configured to provide the operational state information indicating an activated state to the feedback module 706 and/or a remote system (e.g., the service provider computer(s) 502, the user device(s) 510, the access controller device(s) 534, etc.). In some embodiments, the state management module 704 may be configured to provide the operational state information to the communications module 708. In some embodiments, receipt of the operational state information indicating an activate state, the communications module 708 may be configured to begin transmitting one or more radio signals via the transmitter(s) 520 of FIG. 5. As described above, if multiple radio signals are transmitted, each signal may differ in frequency and/or range. The communications module 708 may be configured to provide the state management module 704 feedback indicating that the radio signals are being transmitted. In some embodiments, the state management module 704 may refrain from generating, providing, and/or storing operational state information until it receives feedback from the communications module 608 indicating that the radio signals are being transmitted.

Providing the operational state information indicating an activated state to the workspace management module 601 may cause the workspace management module 601 to commence a fault detection process associated with the wearable user device on which the device management module 530 operates. Or in other words, trigger the functionality of the fault detection module 618 of FIG. 6. In some embodiments, receiving the operational state information indicating the activated state may cause workspace management module 601 to transmit an activation response to an access controller device (e.g., an access controller device of the access controller device(s) 534 that corresponds to a particular access point, an access controller that previously requested activation of the user device, etc.) to instruct or otherwise cause the access controller device to allow access to the workspace via its corresponding access point. This may include removing, or causing to be removed, any suitable number of physical barriers associated with the access point.

In some embodiments, the communications module 708 may be configured to transmit the one or more radio signals via the transmitter(s) 520 according to a predetermined scheme and/or schedule. By way of example, the communications module 708 may cause a first transmitter of the transmitter(s) 520 to transmit one or more radio signals at particular frequencies (e.g., 125 kHz, 925 MHz, 433 MHz, or any suitable combination of the above). The communications module 708 may be configured to exchange information with any suitable number of additional transmitter(s) of a user device (e.g., the user device 514) to exchange any suitable information associated with the transmitter(s). In some embodiments, the communications module 708 may transmit any suitable data to coordinate alternating transmission of the one or more radio signals by multiple transmitter devices. In some embodiments, there may be multiple instances of the communications module 708 in operation. Each instance may correspond to a single transmitter of the transmitter(s) 520 of FIG. 5.

The fault detection module 710 may be configured to monitor transmission of one or more other transmitters of a user device (e.g., the user device 514). By way of example, while another transmitter device is transmitting one or more radio signals, the fault detection module 610 may be configured to monitor the transmissions of the other transmitter device. Should the fault detection module 710 fail to detect one or more of the expected transmissions of the other transmitter device, the fault detection module 710 may be configured to inform the workspace management system that the other transmitter device is faulty (e.g., failing to transmit at least one expected radio signal). It should also be appreciated that fault detection module 710 may be configured to monitor for errors/faults of any suitable component of a transmitter and transmit an indication of such errors/faults to the workspace management system. In some embodiments, there may be multiple instances of the fault detection module 710 in operation. Each instance may correspond to a single transmitter of the transmitter(s) 520 of FIG. 5.

According to some embodiments, the fault detection module 710 and the communications module 708 may exchange any suitable data in order to coordinate transmission and fault monitoring tasks according to any suitable predetermined scheme and/or schedule. By way of example, the communications module 708 may be configured to transmit one or more radio signals for a predetermined period of time. When the period of time has elapsed, the communications module 708 may cease transmitting and may transmit data to the fault detection module 710 to cause the fault detection module 710 to commence monitoring of the one or more other transmitters of the user device 514.

The fault detection module 710 may further be configured to monitor for faults of the other transmitters for a predetermined monitoring time period. Upon that time period elapsing, the fault detection module 710 may cease monitoring the other transmitters and may transmit any suitable data to the communications module 708 to cause the communications module 708 to begin another period of transmission. This process may be performed any suitable number of times. It should be appreciated that the fault detection module 710 may monitor for faults of a particular transmitter at any suitable time regardless of whether the transmitter is currently transmitting radio signals or monitoring radio signals transmitted by other transmitter devices.

Upon receipt of an operational state information indicating an activated state, the feedback module 706 may determine corresponding feedback to be provided via one or more feedback devices of the user device. While the wearable user device operates in an activated state, the feedback module 706 may be configured to provide any suitable feedback via one or more feedback devices of the user device to indicate the activated state. For example, one or more audible beeps corresponding to a power on state may be presented via a speaker of the wearable user device. Additionally, or alternatively, one or more LED lights of one or more feedback devices (e.g., feedback device 212) may present a particular color and/or pattern associated with a activated state (e.g., a solid blue blinking light). Additionally, or alternatively, one or more feedback devices may be utilized present haptic feedback (e.g., a vibration) that indicates the power on state of the wearable user device. The particular strength of the vibration and/or the number and/or pattern of vibrations may be unique to the activated state.

In some embodiments, the state management module 704 may receive user input (e.g., via the input processing module 702) indicating an action to deactivate the user device. In some embodiments, the user input may correspond to the user moving a knob to a position associated with deactivating the wearable user device, although other user input mechanisms may be employed to indicate an action to deactivate the user device. As another example, a deactivation instruction may be received from the activation management module 622 of FIG. 6. Upon receiving such input (e.g., from the user device or the activation management module 622), the state management module 704 may be configured to generate and store operational state information indicating the user device is deactivated. In some embodiments, the state management module 704 may be configured to provide the operational state information indicating a deactivated state to the feedback module 706 and/or a remote system (e.g., the activation management module 622 or other component of the workspace management module 601).

In some embodiments, the state management module 704 may be configured to provide data indicating a deactivate action and/or the operational state information to the communications module indicating the deactivated state. Upon receiving such data, the communications module 708 may be configured to cease transmission of one or more radio signals of the transmitter(s) 520 of FIG. 5. In some embodiment, the state management module 704 may transmit to the communications module 708 the user input indicating the action to deactivate to cause the communications module 708 to cease transmission of the one or more radio signals via the transmitter(s) 520. The communications module 708 may be configured to provide the state management module 704 feedback indicating that radio signal transmission has been halted. In some embodiments, the state management module 704 may refrain from generating, providing, and/or storing operational state information indicating a deactivate state until it receives feedback from the communications module 708 indicating that the radio signals are being transmitted. Providing the operational state information indicating a deactivate state of the user device (identified by a device identifier) to the workspace management module 601 may cause a fault detection process associated with the user device to cease. For example, the workspace management module 601, upon receiving operational state information indicating a deactivated state may, among other things, cause fault detection module 618 to cease monitoring the network connections of the transmitter associated with that user device.

Upon receipt of operational state information indicating a deactivated state, the feedback module 706 may determine a corresponding feedback to be provided via one or more feedback devices of the wearable user device. While the wearable user device operates in a deactivated state, the feedback module 706 may be configured to provide any suitable feedback via one or more feedback devices of the user device (e.g., feedback device 212) to indicate the deactivated state. For example, one or more audible beeps corresponding to a power on state may be presented via a speaker of the wearable user device. Additionally, or alternatively, one or more LED lights of one or more feedback devices may present a particular color and/or pattern associated with a deactivated state (e.g., a relative slow blue blinking light). Additionally, or alternatively, one or more feedback devices may be utilized present haptic feedback (e.g., a vibration) that indicates the deactivated state of the wearable user device. The particular strength of the vibration and/or the number and/or pattern of vibrations may be unique to the deactivated state, although in some embodiment the feedback provided in response to the deactivated state may be the same, or similar to the feedback provided in response to the power on state.

At any suitable time (potentially regardless of whether the user device is operating in an activated or deactivated state), the identification management module 712 may be configured to transmit identification information identifying a particular user device (e.g., the user device 514). In some embodiments, the identification information may be transmitted by the feedback device 212 (e.g., a light emitting diode (LED)) via one or more light signals. In some examples, the identification information may be transmitted based at least in part on modulating a light signal according to a predefined protocol to indicate an identifier for the user device. In some embodiments, the feedback module 706 and the identification management module 712 may manage output of a common device (e.g., feedback device 212) to indicate operational state as well as to communicate identification information for the user device. In some embodiments, communication of the operational state of the user device and the identification information of the user device utilizes a common feedback device and the communications associated with each are offset such that communicating operational state does not interfere with communications associated with the identification information, and vice versa. By way of example, both feedback of operational status and communication of identification information may utilize light signals corresponding to different rates, frequencies, durations, colors, signal patterns, or the like. For example, a blinking green light may be emitted via the user device to indicate an active operational status. This light may be visible to the human eye and may blink once a second, for example. The same user device may emit, periodically, a rapid sequence and/or pattern of light signals to communicate the identification information associated with the user device (e.g., as part of a request for access submitted at interface 402A of FIG. 4). The light emissions provided for indicating operational status may be offset (purposefully transmitted at a different time and/or according to a different periodicity or schedule) so as to not interfere with the light emissions provided that communicate the identification information of the user device.

Figure 8:
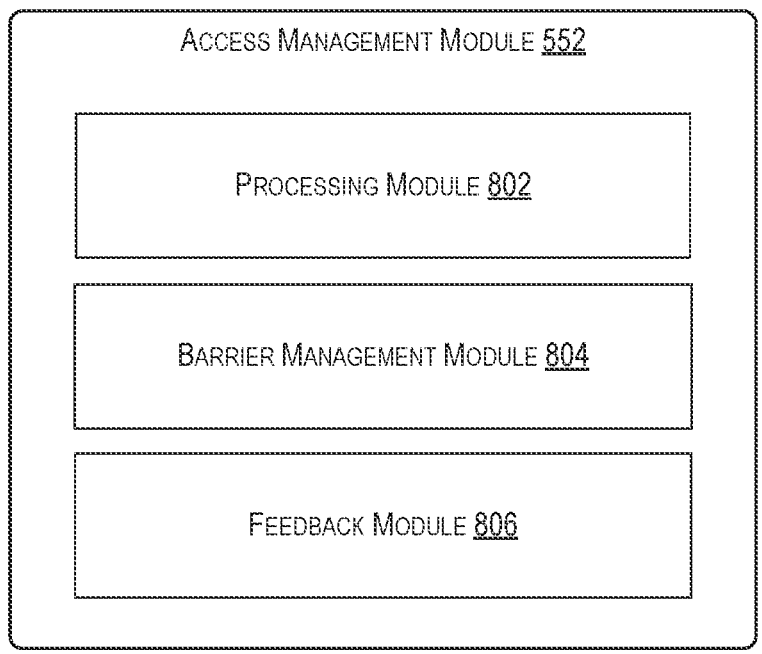
FIG. 8 illustrates in greater detail the components of a particular embodiment of an access management module, in accordance with at least one embodiment.

FIG. 8 illustrates in greater detail the components of a particular embodiment of the access management module 552 of FIG. 5. As depicted in FIG. 8, access management module 552 includes processing module 802, barrier management module 804, and feedback module 806 although more or fewer modules may be utilized to provide the functionality described.

Processing module 802 may be configured to receive and process any suitable data received from a user device (e.g., via the device management module 530 of FIGS. 5 and 7 of the user device 514 of FIG. 5) and/or from a service provider computer (e.g., via the workspace management module 590 of FIGS. 5 and/or 601 of FIG. 6). By way of example, the processing module 802 may be configured to receive (e.g., via WiFi) identification information associated with a particular user device (e.g., the user device 514). In some embodiments, the identification information is received from the actual user device corresponding to the identification information and/or from another user device (e.g., a handheld device, a stationary computer, etc.) separate from the one that corresponds to the identification information. In some embodiments, the processing module 802 may be configured to store the identification information received for the user device.

In some embodiments, the identification information may be received as part of an access request (e.g., a request to allow access to user device 514 at a particular access point). In some embodiments, the access request may be additionally considered to be an activation request for a particular user device for which access is requested (e.g., a request to activate user device 514). In some embodiments, a component of a user device (e.g., feedback device 202) may be positioned at a receiving device (e.g., the receiving device 402A of FIG. A) associated with an access point of the workspace (e.g., workspace 110 of FIG. 1). The component of the user device may be utilized to communicate (e.g., via one or more light signals produced by a light emitting diode) identification information for the user device for which access and/or activation is requested. In some embodiments, processing module 802 may be configured to determine whether the identification information previously received and stored (referred to as "initial identification information") matches the identification information received at the receiving device (e.g., through the utilization of the one or more light signals). In some embodiments, the processing module 802 may be configured to reject the request for access and/or activation if the initial identification information does not match the identification information receive at the receiving device. In some embodiments, the processing module 802 may be configured to transmit a request for access and/or activation to a remote system (e.g., the workspace management module 601 of FIG. 6) if the initial identification information matches the identification information receive at the receiving device. The request transmitted to the remote system may include the identification information for the user device, any suitable identification information (e.g., one or more identifiers) of the access point and/or a corresponding access controller device, or the like.

In some embodiments, the feedback module 806 may present (e.g., via a light, a display, a speaker, etc.) any suitable indication of the operations and/or status of the access controller device and/or the access point. By way of example, the feedback module 806 may indicate when the receiving device utilized by the access controller device (e.g., the receiving device 410 of FIG. 4) is ready to receive input. As another example, the feedback module 806 may be configured to present information (e.g., via the display and/or speaker of interface 402A) indicating the request for access (or activation) has been transmitted (e.g., to the workspace management module 601). The feedback module 806 may present any suitable data received (e.g., from the workspace management module 601) indicating that access/activation was granted and/or denied.

Barrier management module 804 may be configured to operate (or cause another module separate from the access management module 552 to operate) one or more physical barrier devices. The physical barrier device(s) may include any suitable device configured to place, remove, manipulate, move, or otherwise position any suitable physical barrier (e.g., a door, a lock, a gate, a light curtain, etc.). As a non-limiting example, the barrier management module 804 may be configured to operate one or more actuators that enables a door associated with an access device to be locked or unlocked. In some embodiments, the barrier management module 804 may be configured to allow access (e.g., unlock a door) such that access is allowed in one direction (e.g., out of the workspace) while restricted from another direction (e.g., into the workspace). The functionality of the barrier management module 804 may be invoked by the processing module 802. By way of example, receiving an indication that the user device corresponding to a previously transmitted access request has been activated may cause the processing module 802 to invoke the functionality of the barrier management module 804 to allow access to the workspace. As another example, receiving data from an input device (e.g., a button) of the workspace (located within the workspace) may cause the processing module 802 to invoke (e.g., via function call or otherwise) the functionality of the barrier management module 804 to enable the barrier device to be moved (e.g., a door to be opened enabling a user and/or device to exit the workspace). As yet another example, the processing module 802 may receive a signal or other indication (e.g., via the input device 408 of FIG. 4) indicating the access point is being placed in a particular operational state (e.g., disarmed, under maintenance, etc.). As a result, the processing module 802 to invoke the functionality of the barrier management module 804 to enable the barrier device to be moved. The same or different input device may be utilized to transition the access point in a similar manner back to a state in which access is allowed or restricted based on receiving identification information of a user device.

In some embodiments, processing module 802 may identify a request to exit the workspace (e.g., via a button within the workspace). In some embodiments, processing module 802 may invoke the functionality of the feedback module 806 to prompt a deactivation request. For example, any suitable data may be presented via the input/output devices of the user device (e.g., via a display, a speaker, a light, etc.) to prompt the user to deactivate the user device. In some embodiments, deactivation may include the user positioning the feedback device 212 at a receiving device (e.g., receiving device 410). Once again, identification information for the user device may be obtained by the processing module 802 in this manner. In some embodiments, the user device, currently operating in an activated state, may specifically include an indication that the identification information is provided as part of a deactivation request. In other embodiments, the processing module 802 may maintain identification information corresponding to previously activated and/or currently active user devices (e.g., activated either at a corresponding access point or another access point of the workspace). Additionally, or alternatively, the processing module 802 may request (e.g., from the workspace management module 601) information indicating whether the user device currently operating in an activated state or not. If the identification information corresponds to a previously activated user device, the processing module 802 may determine that the identification information corresponds to a deactivation request. The processing module 802 may transmit (e.g., to the workspace management module 601) any suitable information (e.g., any suitable portion of the identification information associated with/received from the user device, an indicator indicating the request is a deactivation request, or the like) to request deactivation of the user device. The workspace management module 601 may process the deactivation request. As part of that processing, the workspace management module 601 may transmit and/or exchange any suitable data with the user device to cause the user device to transition to a deactivated state. While operating in the deactivated state, the user device may no longer transmit radio signals which would, if transmitted, modify movements of various components of the workspace (e.g., the MDUs 104 of FIG. 1).

Figure 9:
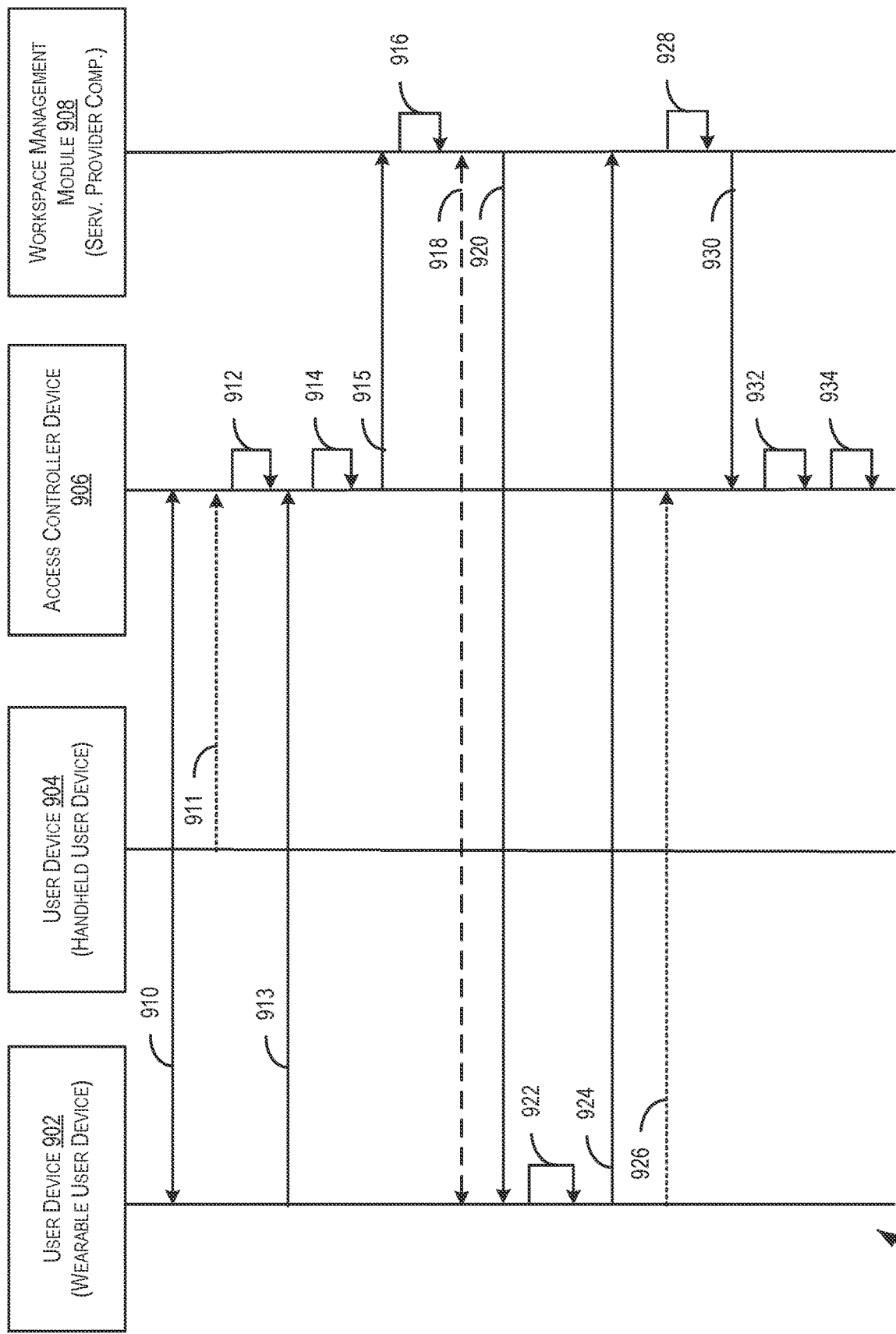
FIG. 9 illustrates an example method for performing automated user device activation and access management associated with an area, in accordance with at least one embodiment.

FIG. 9 illustrates an example method 900 for automated user device activation and access management associated with an area (e.g., the workspace 110 of FIG. 1), in accordance with at least one embodiment. The method 900 may be performed by the user device 902, (e.g., the user device 514 of FIG. 5), the user device 904 (e.g., a handheld user device of the user device(s) 510 of FIG. 5), the access controller device 906 (an example of the access controller device 534 of FIG. 5), and the workspace management module 908 (e.g., the workspace management module 601 of FIG. 6 operating at service provider computer(s) 502 of FIG. 5).

The method 900 may begin at 910, where the user device 902 may transmit (e.g., via transmitter(s) 520 of FIG. 5) data including identification information associated with the user device 902. In some embodiments, the identification information may include one or more identifiers of the user device 902 that uniquely identify and/or distinguish the user device 902 from other user devices of the system. Although not depicted, the identification information may be additionally or alternatively provided by the user device 904 at 911 as part of operations performed corresponding to designating/storing a planned path of a user/the user device 902. For example, a user may provide input via one or more interface of the user device 904 indicating: 1) that he is operating the user device 902, 2) the identity of the user device 902 (via identification information associated with the user device 902), 3) a planned path the user plans to take to enter the workspace, 4) an access point at which the user plans to enter the workspace, or any suitable combination of the above.

At 912, the identification information may be received by the access controller device 906. Any suitable portion of the identification information may be stored in local memory at the access controller device 906. In some embodiments, an identifier that uniquely identifies the user device 902 may be stored to indicate access is requested for the user device. In some embodiments, the identification information received at 904 and transmitted at 902 may include an indication that the identification information is provided for to request access through the access point and/or activation of the user device 902. In some embodiments, the received information may be determined to constitute a request to access the workspace through the access point and/or activate the user device 902 based at least in part on identifying that the identification information of the user device 902 is not stored in memory at the access controller device 908.

At 913, the user device 902 may be utilized to provide the identification information to the access controller device 906 via a different communication channel than the one used at 910. By way of example, the identification information may be transmitted via one communication method (e.g., WiFi) at 910, while the identification information may be provided at 913 by the user device 902 using a second communication method (e.g., the feedback device 212 to emit a series of one or more light signals via a light emitting diode in the manner described above in connection with the interfaces of FIGS. 4A and/or 4B). Any suitable portion of the identification information may be stored in local memory at the access controller device 906. In some embodiments, an identifier that uniquely identifies the user device 902 may be stored to indicate access is requested for the user device. In some embodiments, the identification information received at 904 and transmitted at 902 may include an indication that the identification information is provided for to request access through the access point and/or activation of the user device 902. In some embodiments, the received information may be determined to constitute a request to access the workspace through the access point and/or activate the user device 902 based at least in part on identifying that the identification information of the user device 902 is not stored in memory at the access controller device 908.

In some embodiments, the access controller device 906 may be configured to determine whether the identification information received at 910 (and/or at 911) matches the identification information received at 913. In some embodiments, the access controller device 906 may reject the access request if the identification information does not match. If so, the access controller device 906 may transmit data to the user device 902 indicating the same and/or the access controller device 906 may present an indication that the request was rejected at any suitable input/output device (e.g., via the display 406 of FIG. 4A, via the speaker 404, etc.). If the request is rejected, the method 900 may then cease. In this scenario, the operations discussed at 915-934 may not be performed. If the request is granted (e.g., based at least in part on determining that the identification information received at 910/911 and 913 matches, the protocol may continue to 915.

At 915, the access controller device 906 may transmit an access request to the workspace management module 908. The access request may include any suitable portion of the identification information (e.g., an identifier for the user device 902) and an identifier of the access controller device 906 or an identifier of the access point corresponding to the access controller device 906. In some embodiments, the access request may be considered to be a request to activate user device 902.

At 916, the workspace management module 908 (e.g., workspace management module 601 of FIG. 6, the activation management module 622, etc.) may receive the access request. In some embodiments, the workspace management module 908 may execute any suitable operations for activating the user device 902. In some embodiments, the workspace management module 908 may determine whether one or more conditions are met for activating the user device 902 according to a predefined rule set. For example, the workspace management module 908 may identify (e.g., from previously stored data) that the user device 902 is generally allowed access to the workspace. In some embodiments, determining whether one or more conditions are met for activating the user device may include exchanging, receiving, and/or transmitting one or more messages to the user device 902 at 918. By way of example, the workspace management module 908 may transmit a request for operational status to the user device 902 and/or the user device 902 may transmit its operational status at any suitable time after transmitting the identification information at 910. The workspace management module 908 may be configured to utilize the operational status of user device 902 (e.g., indicating the user device's transmitters are currently not transmitting signals that may potentially modify movements of components within the workspace, that only identification information is currently being transmitted by the transmitters of the user device 902, that the user device 902 is in a deactivated state, etc.) in order to determine whether the user device 902 may be activated according to the predefined rule set.

At 920, upon determining that the one or more conditions of the predefined rule set have been met, the workspace management module 908 may transmit data to the user device 902 indicating a request and/or an instruction to transition to an activated state. The request may include an indicator that indicates the request is for activation (e.g., as opposed to deactivation, for example).

At 922, the user device 902 may perform any suitable operations for transitioning to an activated state. In some embodiments, transitioning to the activated state may include, among other things, beginning transmissions via transmitter(s) (e.g., radio transmitters 206 and 207) of the user device 902. These transmissions may be configured to modify movements of components in the system (e.g., the MDUs 104) as described above at least in connection with FIG. 1.

At 924, the user device 902 may transmit an indication of the operational status of the user device 902 to the workspace management module 908. In some embodiments, the operational status may indicate that the user device 902 is operating in an activated state (e.g., in which the radio signal(s) described in connection with user device 118-3 of FIG. 3 are being transmitted (e.g., via transmitters 206 and/or 207 of FIG. 2)). In some embodiments, the user device 902 may provide an indication that it is operating in an activated state to the access controller device 906 at 926. If the user device is successfully activated, then it may be true that the user device 902 was connected to the correct area (e.g., workspace 110 corresponding to the access controller device 906); the user device 902 passed initialization checks for the transmitter(s) 206 and/or 207; the user device 902 passed all other initialization self-tests including checks of battery charge; and the workspace management module 908 is capable of performing a failsafe floor-stop of any suitable number of MDUs if a fault in the user device 1002 is detected because the workspace management module 908 is monitoring for faults occurring at the user device 1002.

At 928, the workspace management module 908 may store and/or update data corresponding to the user device 902 to indicate the user device 902 is operating in an activated state.

At 930, the workspace management module 908 may transmit data to the access controller device 906 to indicate that access is to be granted (e.g., based at least in part on identifying, from the data received at 924, that the user device 902 is operating in an activated state). In some embodiments, if the user device 902 has transmitted such data at 926, the workspace management module 908 may not transmit the data at 930.

At 932, the access controller device 906 may store and/or update data indicating the user device 902 is operating in an activated state. By way of example, the access controller device 906 may store data indicating an activated state (e.g., a value corresponding to an activated state) as an association to the identifier corresponding to the user device 902 received at 910.

At 934, the access controller device 906 (e.g., the processing module 802 of FIG. 8) may execute any suitable operations for manipulating one or more barrier devices at the access point. As a non-limiting example, a door (an example of a barrier device) may be closed and/or locked. In response to receiving an indication that the user device 902 is operating in an activated state, the access controller device 906 may execute instructions (or may transmit instructions to another device) to cause the door to be opened and/or unlocked, thus enabling access to the workspace.

Figure 10:
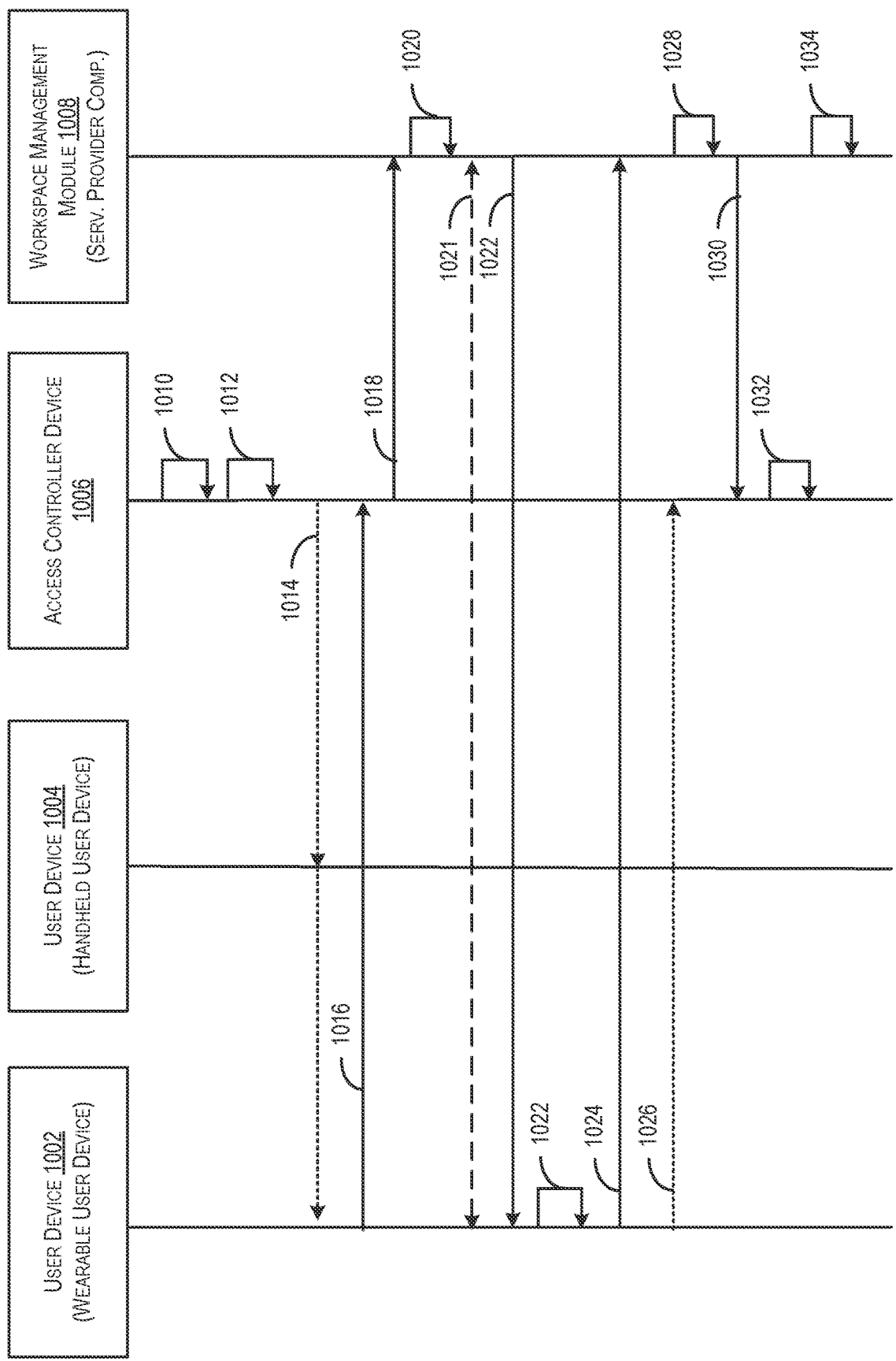
FIG. 10 illustrates an example method for deactivating a user device, in accordance with at least one embodiment.

FIG. 10 illustrates an example method 1000 for deactivating a user device (e.g., user device 1002), in accordance with at least one embodiment. The method 1000 may be performed by the user device 1002, (e.g., the user device 514 of FIG. 5, the user device 902 of FIG. 9, etc.), the user device 1004 (e.g., a handheld user device of the user device(s) 510 of FIG. 5, the user device 904 of FIG. 9), the access controller device 1006 (an example of the access controller device 534 of FIG. 5, the access controller device 906 of FIG. 9, etc.), and the workspace management module 1008 (e.g., the workspace management module 601 of FIG. 6 operating at service provider computer(s) 502 of FIG. 5, the workspace management module 908 of FIG. 9, etc.).

The method 1000 may begin at 1010, where the access controller device 908 may receive an indication (e.g., from an input device of the access controller device 908 such as a button located within the workspace 102) that a user device is exiting the workspace. In some embodiments, the indication can be received from another device separate and distinct from the access controller device 1006. The other device (not depicted) may be configured to manage the input device at which the indication may be initiated and transmit the indication to the access controller device 1008 (e.g., via the network(s) 506 of FIG. 5).

At 1012, the access controller device 1006 may present (e.g., at any suitable component of the interface 4A or 4B of FIGS. 4A and 4B, respectively) a deactivation indicator indicating, requesting, and/or reminding the user to deactivate user device 1002. In some embodiments, the access controller device 1006 may transmit (e.g., broadcast) the deactivation indicator which may be received by the user device 1002 and/or the user device 1004 via the network(s) 506. In some embodiments, if data is received at 1014, the user device 1002 and/or the user device 1004 may present any suitable information (e.g., text, audible feedback, haptic feedback, one or more light signals, etc.) at any suitable interface provided by the user respective user devices to indicate that a request to deactivate the user device 1002 has been received.

At 1016, the user device 1002 may be utilized to provide the identification information to the access controller device 1006. By way of example, the identification information may be transmitted using the feedback device 212. Feedback device 212 may be used to emit a series of one or more light signals via a light emitting diode in the manner described above in connection with the interfaces of FIGS. 4A and/or 4B). In some embodiments, an identifier that uniquely identifies the user device 1002 may be stored (and/or data previously stored at the access controller device 1006 may be updated) to indicate deactivation is requested for the user device 1002. In some embodiments, the identification information received at 1016 may include an indication that the identification information is provided for to request deactivation of the user device 1002. In some embodiments, the received information may be determined to constitute a request to deactivate the user device 1002 based at least in part on identifying that the identification information of the user device 1002 input has been received at an input device (e.g., a button) associated with the access controller device 1006 and the identification information received at 1016 matches an identifier of a previously activated user device (as indicated from a mapping stored locally at the access controller device 1006). It should be appreciated that, in some embodiments, movement of the barrier device (e.g., movement of a door and/or gate, movement of the barrier device in a particular direction, etc.) at the access point may be considered input provided at an input device that indicates a user device is exiting the workspace.

At 1018, the access controller device 1006 may transmit a deactivation request to the workspace management module 1008. The deactivation request may include any suitable portion of the identification information (e.g., an identifier for the user device 1002) and an identifier of the access controller device 1006 or an identifier of the access point corresponding to the access controller device 1006. In some embodiments, the access request may be considered to be a request to deactivate user device 1002.

At 1020, the workspace management module 1008 (e.g., workspace management module 601 of FIG. 6, the activation management module 622, etc.) may receive the deactivation request. In some embodiments, the workspace management module 1008 may execute any suitable operations for deactivating the user device 1002. In some embodiments, the workspace management module 1008 may determine whether one or more conditions are met for deactivating the user device 1002 according to a predefined rule set. In some embodiments, determining whether one or more conditions are met for deactivating the user device 1002 may include receiving and/or transmitting one or more messages to/from the user device 1002 at 1021.

At 1022, upon determining that the one or more conditions of the predefined rule set have been met, the workspace management module 1008 may transmit data to the user device 1002 indicating a request and/or an instruction to transition to a deactivated state. The request may include an indicator that indicates the request is for deactivation (e.g., as opposed to activation, for example).

At 1023, the user device 1002 may perform any suitable operations for transitioning to a deactivated state. In some embodiments, transitioning to the deactivated state may include, among other things, halting transmissions of the transmitter(s) (e.g., radio transmitters 206 and 207) of the user device 1002 that were previously being transmitted. The transmissions, when transmitted, may be configured to modify movements of components in the system (e.g., the MDUs 104) as described above at least in connection with FIG. 1.

At 1024, the user device 1002 may transmit an indication of the operational status of the user device 1002 to the workspace management module 1008. In some embodiments, the operational status may indicate that the user device 1002 is operating in a deactivated state (e.g., in which the radio signal(s) described in connection with user device 118-3 of FIG. 3 are not transmitting data that could cause movement of the components within the workspace to be altered). In some embodiments, the user device 1002 may provide an indication that it is operating in a deactivated state to the access controller device 1006 at 1026.

At 1028, the workspace management module 1008 may store and/or update data corresponding to the user device 1002 to indicate the user device 1002 is operating in a deactivated state.

At 1030, the workspace management module 1008 may transmit data to the access controller device 1006 to indicate that the user device 1002 is operating in a deactivated state. In some embodiments, if the user device 1002 has transmitted such data at 1026, the workspace management module 1008 may not transmit the data at 1030.

At 1032, the access controller device 1006 may update data indicating the user device 1002 is operating in a deactivated state. In some embodiments, the access controller device 1006 may delete any suitable portion of the previously stored data associated with the user device 1002.

At 1034, in some embodiments, the workspace management module 1008 may delete any suitable portion of the previously stored data associated with the user device 1002.

Figure 11:
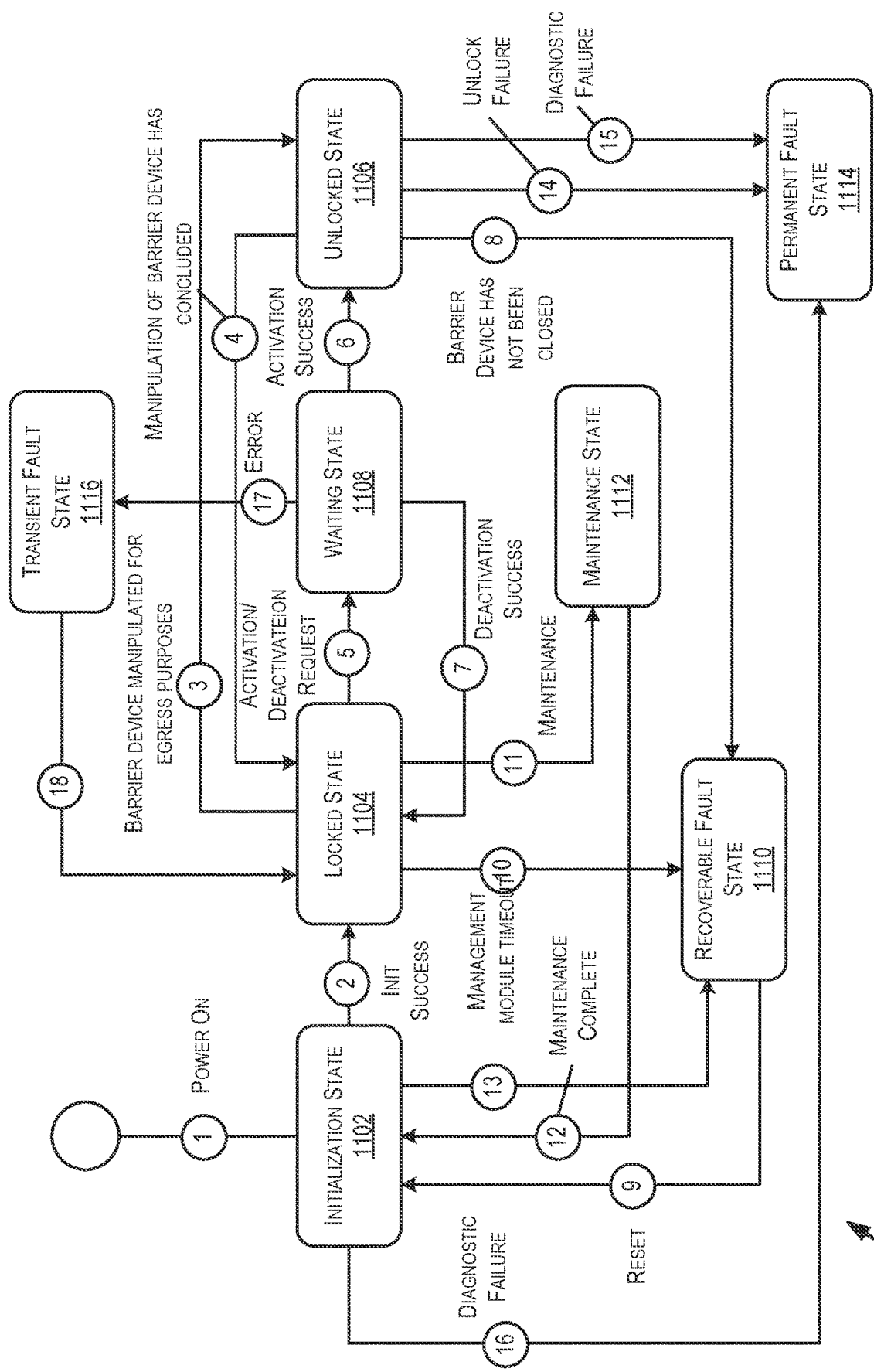
FIG. 11 is a flow diagram illustrating example state transitions between system states of at least one component of an inventory management system, in accordance with at least one embodiment.

FIG. 11 is a flow diagram 1100 illustrating example state transitions between system states of at least one component of an inventory management system (e.g., the access controller device 534 of FIG. 5), in accordance with at least one embodiment.

At step 1, the access controller device may be powered on and transitioned to an initialization state 1102. Any suitable number of diagnostics and/or initialization operations may be performed while the user device is operating in the initialization state 1102. If the initialization operations are successful, the access controller device may transition to locked state 1104 at step 2. While in the locked state 1104, the access controller device may monitor for any suitable combination of: 1) data received by any suitable user input device (e.g., light signals received by the receiving device(s) of FIGS. 4A and 4B, activation of a button or other input device at the access point indicating an intent of the user to enter the workspace, or the like), and/or 2) data from one or more barrier sensors (e.g., sensors located at a door or gate of the access point) that indicate an object (e.g., a user, a user device) is exiting the workspace. In some embodiments, any suitable diagnostic operations may be performed while the access controller device operates in the locked state 1104. A barrier device at the access point may be locked or otherwise manipulated and/or positioned to block access to the workspace from outside the workspace while the access controller device operates in the locked state. In some embodiments, the access controller device may transmit data at step 2 (or any suitable time) to a barrier device (e.g., actuators corresponding to a door) that causes the barrier device to restrict (e.g., physically restrict) access to the workspace.

At step 3, the access controller device may transition to unlocked state 1106 if data is received indicating the barrier device was manipulated for egress purposes. By way of example, one or more door sensors associated with a door of the access point may transmit data to the access controller device indicating that the barrier device (e.g., the door) was opened (and/or the door was opened from within the workspace, and/or the door was opened using a push bar or the like, etc.). While operating in unlocked state 1106, entry to and/or exiting from the workspace via the access point may be allowed/enabled.

At step 4, the access controller device may transition back to the locked state 1104. In some embodiments, this transition may occur due to identifying (e.g., from the sensor data of the door) that manipulation of the barrier device has concluded. In the ongoing example, manipulation of the barrier device may be identified as being concluded when the door is closed. The door may be relocked upon transitioning to the locked state 1104. As another example, a timer may be set upon receiving an indication that the barrier device was manipulated for egress purposes and the door may be relocked upon expiration of the timer.

At step 5, an activation or a deactivation request may be received (e.g., in the manner described above in connection with method 900 and/or method 1000, respectively). In some embodiments, receiving an activation/deactivation request may include receiving identification information from a user device that constitutes an activation and/or deactivation request. In some embodiments, receiving such a request may cause the access controller device to transmit a request to the workspace management module 601 and transition to waiting state 1108.

At step 6, a response may be received from the workspace management module 601 indicating the activation was successful (e.g., the activated request was granted and/or the corresponding user device has been activated). Receipt of this information may cause the access controller device to transition to the unlocked state 1106.

At step 7, a response may be received from the workspace management module 601 indicating the deactivation was successful (e.g., the deactivated request was granted and/or the corresponding user device has been deactivated). Receipt of this information may cause the access controller device to transition to the locked state 1104.

At step 8, an indication may be received indicating a barrier device failed to return to a particular state and/or position. By way of example, a timer may be set when a door of the access point has been opened. Upon expiration of this timer, and a determination (e.g., from sensor data of one or more door sensors) that the door has not been returned to a closed position, the access controller device may transition to recoverable fault state 1110. In some embodiments, while operating in recoverable fault state 1110, the access controller device may present (e.g., via any of the components of FIGS. 4A and/or 4B, any suitable data (e.g., an error code, text, an audible alert, etc.) indicating the barrier device has not been returned to the expected state and/or position. The access controller device may continue monitoring the sensor devices to determine whether the barrier device is eventually returned to the expected state and/or position (hereinafter referred to as a "reset). If a reset has occurred, the access controller device may transition at step 9 to the initialization state 1102. Although not depicted, in some embodiments, the access controller device may transition back to the locked state 1104 when the barrier device has been reset.

In some embodiments, while operating in the locked state, the access controller device may be configured to receive periodic signals form the workspace management module indicating the workspace management module is capable of performing stop procedures to stop one or more (e.g., all) of the moving components (e.g., MDUs 104) within the workspace. In some embodiments, if such a signal has not been received from the workspace management module for a threshold time period, the access controller device may transmit an indication of the issue to the workspace management module and transition to the recoverable fault state 1110. If a signal is subsequently received from the workspace management module (e.g., indicating the stopping capability is available), the access controller device may transition to the initialization state 1102 and eventually back to the locked state 1104.

In some embodiments, the access controller device may transition at step 11 to a maintenance state 1112. In some embodiments, this transition may be triggered based at least in part on input provided at the access controller device (e.g., via the input device 408 of FIG. 4). In some embodiments, the transition may be triggered based at least in part on receiving information from the workspace management module instructing the access controller device to transition to maintenance state 1112. At step 12, when the maintenance is complete (e.g., ascertained based at least in part on additional information received via the input device 408 and/or the workspace management module), the access controller device may transition to initialization state 1102, and eventually back to locked state 1104.

In some embodiments, the access controller device may transition to the recoverable fault state 1110 if the barrier device is manipulated (e.g., a door is opened) while the access controller device operates in the initialization state 1102. In some embodiments, if the barrier device is reset (e.g., replaced to an expected state and/or position with which access to the workspace is restricted and/or blocked), the access controller device may transition back to the initialization state 1102.

In some embodiments, the access controller device may transition to permanent fault state 1114 if an unlock failure has been detected at the barrier device as depicted at step 14. As another example, the access controller device may transition to the permanent fault state 1114, as depicted at step 15, if a diagnostic failure is detected (e.g., a failure of periodic diagnostics performed while operating in the locked state 1104). The access controller device may transition to permanent fault state 1114 at step 16 if a diagnostic fault and/or error is encountered while the access controller device operates in the initialization state 1102. In some embodiments, while operating in the permanent fault state 1114, the access controller device may manipulate the barrier device to once again restrict access to the workspace (e.g., lock the door). In some embodiments, an indication of the state may be provided via any suitable component of the interfaces 4A and/or 4B. In some embodiments, an indication of the state of the access controller device may be presented via a user device (e.g., a handheld user device of the user devices 510 of FIG. 5). In some embodiments, workspace management module may be notified by the access controller device that the access controller device is operating in the permanent fault state 1114. In some embodiments, the access controller device may need to be restarted (e.g., powered off and powered on) to recover from the permanent fault state 1114. If restarted, the access controller device may transition back to the initialization state 1102.

In some embodiments, the access controller device may transition at step 17 to a transient fault state 1116 based at least in part on any suitable conditions detected while the access controller device operates in the waiting state 1108. As a non-limiting example, a time period elapsing since a last message was received from the workspace management module, an input error is detected at any of the components of the interfaces 4A and/or 4B, an error is detected with any suitable component associated with the barrier device. While operating in the transient fault state 1116, the access controller device may provide (e.g., via any suitable component of the interfaces 4A and/or 4B, via the user device(s) 510 of FIG. 5, etc.) information that is associated with the condition that caused the transition at step 17. Once provided, the access controller device may automatically transition back to the locked state 1104 at 18.

Figure 12:
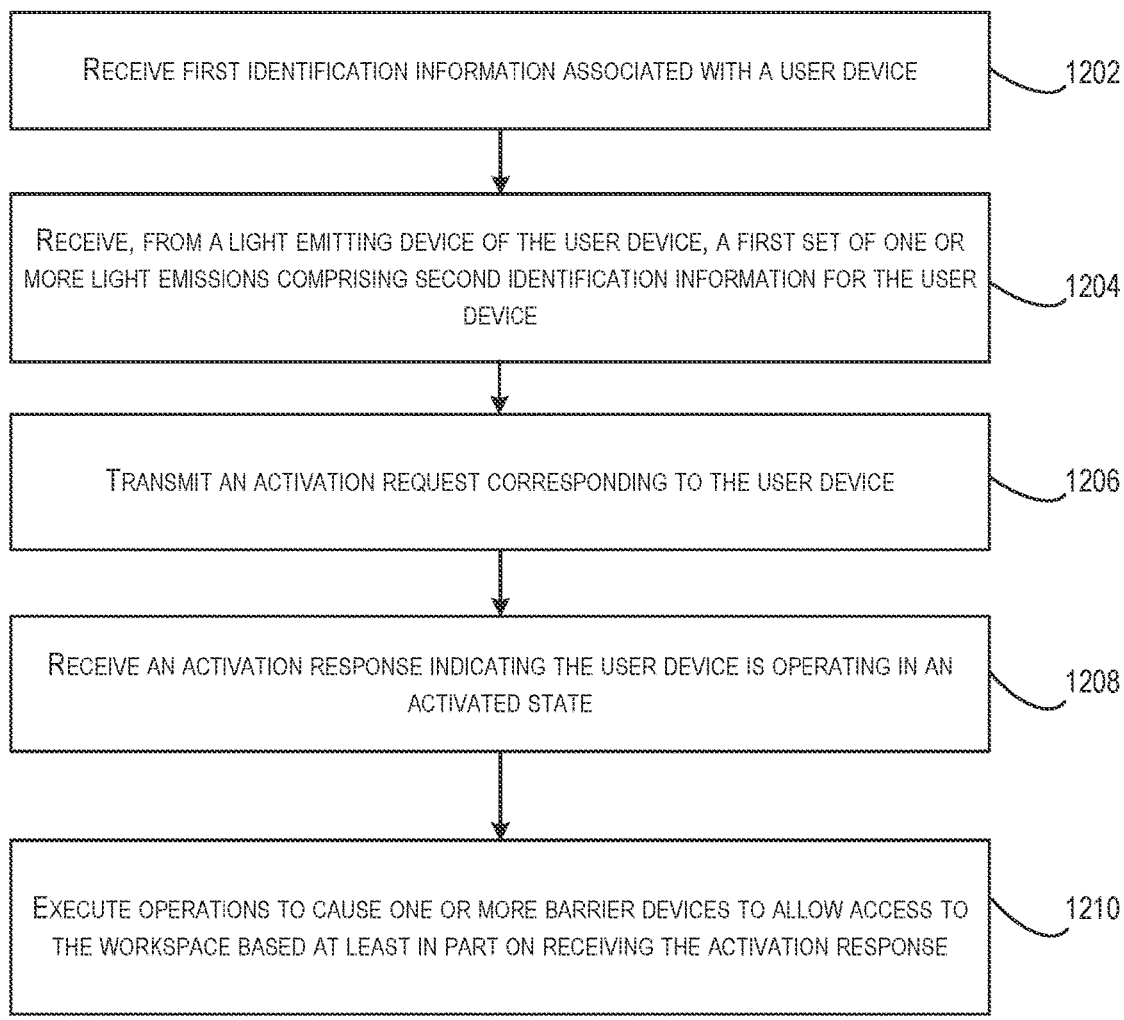
FIG. 12 illustrates a flow diagram of an example method for utilizing various components of an inventory management system, in accordance with at least one embodiment.

FIG. 12 illustrates a flow diagram of an example method 1200 for utilizing various components of an inventory management system, in accordance with at least one embodiment. The method 1200 may be performed with any suitable combination of the user device(s) 510 of FIG. 5 (each an example of a handheld device and/or the user device 118 of FIG. 1), an access controller device (e.g., the access controller device 534 of FIG. 5), and/or one or more service provider computers (e.g., the service provider computer(s) 502 of FIG. 5). The operations of method 1200 may be performed in any suitable order. In some embodiments, more or fewer operations are contemplated.

The method may begin at 1202, where first identification information associated with the user device (e.g., the user device 118-1 of FIG. 1) may be received. In some embodiments, the first identification information can comprise an identifier of the user device. The first identification information may be received from a computing device that differs from the user device or from the user device itself. By way of example, the user device may transmit (e.g., via the transmitter(s) 206 and/or 207 of FIG. 2, via WiFi, etc.) its identification information. Additionally, or alternatively, the identification information may be received from a second user device (e.g., a handheld or stationary device utilized to associate a user with the user device, to identify a planned path for accessing and/or moving around the workspace, to identify a particular access point as the planned point of entry, etc.).

At 1204, a first set of one or more light emissions comprising second identification information for the user device may be received (e.g., from a light emitting device of the user device such as the feedback device 212 of FIG. 2). In some embodiments, the light emitting device may be configured to emit a second set of one or more light emissions indicating an operational state of the user device. In some embodiments, the first set of one or more light emissions may be imperceptible to the user and the second set of one or more light emission may be perceptible by the user.

At 1206, an activation request corresponding to the user device may be transmitted (e.g., by the access management module 552 of FIG. 5 to workspace management module 590 of FIG. 5). In some embodiments, the activation request may be transmitted in response to receiving the first set of one or more light emissions. The activation request may include any suitable data including, but not limited to, any suitable portion of the identification received via the first set of light emissions, an identifier associated with the access point and/or the device transmitting the activation request, an indication that the request pertains to activation, or any suitable combination of the above. The receiving device (e.g., the workspace management module 590) may be configured to perform any suitable operations for activating the user device in the manner described in the above figures (e.g., in connection with the description of FIG. 9 above).

At 1208, an activation response may be received (e.g., via the workspace management module. The activation response may indicate that the user device is operating in an activated state.

At 1210, operations may be executed (e.g., by the access controller device 534) to cause one or more barrier devices (e.g., barrier device 112 of FIG. 1) to allow access to the workspace based at least in part on receiving the activation response. In some embodiments, executing these operations may cause (e.g., instruct) one or more actuators to alter a state of the barrier device (e.g., to deactivate a light curtain operating as a barrier device) and/or to physically manipulate the barrier device (e.g., to unlock a door that operates as a barrier device).

Utilizing the techniques, devices, and device interactions discussed above, the operations for activating the user device may be automated and required before access to the workspace may be granted. This may result in an enhanced user experience and reduce the chance of user error and/or allowing a faulty or deactivated user device to enter the workspace. Additionally, at least one component of the user device can be utilized for multiple purposes such as providing visible feedback of the operational status of the user device as well as providing identification information (e.g., via imperceptible light emissions) that may be used to activate or deactivate the device. By utilizing the described techniques, the efficiency of the system as a whole may be improved as the procedures for activating the user device are simplified with respect to the user. The system may experience increased throughput and improved efficient as a whole by reducing the chance of collisions and/or of introducing faulty user devices within the workspace that might detrimentally modify movements of various components of the workspace. The system may perform operations for prompting the user to deactivate the user device upon exiting the workspace. In some embodiments, a deactivation request can be initiated in a similar manner (e.g., based on emitting imperceptive light emission in proximity of a receiving device at the access point). A similar automated process may be thereafter performed to deactivate the user device. These operations may reduce the chance of user devices operating outside the workspace from affecting the movements of components within the workspace.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
a workspace management module configured to manage a plurality of mobile drive units configured to move within a workspace, where access to the workspace is restricted at an access point of the workspace by one or more barrier devices;
a user device comprising:
a feedback device configured to: 1) indicate an operational state of the user device and 2) transmit identification information of the user device based at least in part on emitting one or more light signals; and
one or more transmitter devices configured to transmit one or more corresponding signals configured to affect movement of the mobile drive unit on receipt; and
an access controller device comprising:
a processor; and
one or more memories having thereon computer-executable instructions that, when executed by the processor, cause the access controller device to:
receive first identification information corresponding to the user device;
receive, via the one or more light signals of emitted by the feedback device, second identification information corresponding to the user device;
receive, from the workspace management module, an activation response indicating that the user device is operating in an activated state; and execute one or more operations to cause manipulation of the one or more barrier devices at the access point of the workspace, the one or more barrier devices being manipulated to enable access to the workspace via the access point.

2. The inventory management system of claim 1, wherein the one or more light signals emitted by the feedback device are received at a receiving device associated with the access point.

3. The inventory management system of claim 1, wherein indicating the operational state of the user device comprising emitting an additional one or more light signals from the feedback device.

4. The inventory management system of claim 1, wherein the user device is a wearable device.

5. The inventory management system of claim 1, wherein executing the instructions further causes the access controller device to:
  receive an indication that the user device is exiting the workspace; and
  transmit, to the workspace management module, a deactivation request corresponding to the user device.

6. A computer-implemented method performed by an access controller device operating within a workspace, comprising:
  receiving first identification information associated with a user device;
  receiving, from a light emitting device of the user device, a first set of one or more light emissions comprising second identification information for the user device, the light emitting device being configured to emit a second set of one or more light emissions indicating an operational state of the user device;
  in response to receiving the first set of one or more light emissions, transmitting an activation request corresponding to the user device;
  receiving an activation response indicating the user device is operating in an activated state; and
  executing operations to cause one or more barrier devices to allow access to the workspace based at least in part on receiving the activation response.

7. The computer-implemented method of claim 6, wherein the user device transmits one or more wireless signals while operating in the activated state, and wherein transmission of at least one of the one or more wireless signals affects movement of a mobile component configured to move within the workspace.

8. The computer-implemented method of claim 7, wherein receiving the one or more wireless signals by the mobile component causes the mobile component to stop or reduce speed.

9. The computer-implemented method of claim 6, wherein the first identification information is received from a computing device different from the user device.

10. The computer-implemented method of claim 6, wherein the first set of one or more light emissions and the second set of one or more light emissions are transmitted at different times according to a predetermined transmission protocol.

11. The computer-implemented method of claim 6, wherein the first set of one or more light emissions are perceptible by a user of the user device, and wherein the second set of one or more light emissions are imperceptible by the user.

12. The computer-implemented method of claim 6, wherein the second set of one or more light emissions are transmitted by the user device in proximity of a receiving device associated with the access controller device.

13. The computer-implemented method of claim 6, wherein the activation request is transmitted to a workspace management module of the workspace, the workspace management module being configured to monitor the user device while operating in the activated state.

14. A computer-readable storage medium storing computer executable instructions that, when executed by one or more processors of a computing device, causes the computing device to:
  receive, at the computing device associated with an access point of a workspace, first identification information associated with a user device being used to request access to the workspace;
  receive, from a light emitting device of the user device, a first set of one or more light emissions comprising second identification information for the user device, the light emitting device of the user device being configured to emit a second set of one or more light emissions different from the first set of one or more light emissions, the second set of one or more light emissions indicating an operational state of the user device;
  transmit, to a management module of the workspace, an activation request corresponding to the user device;
  receive an activation response indicating the user device is operating in an activated state; and
  execute, based at least in part on receiving the activation response, operations to instruct one or more actuators of one or more barrier devices located at the access point to allow access to the workspace via the access point.

15. The non-transitory computer-readable storage medium of claim 14, wherein the first set of one or more light emissions are imperceptible to a user of the computing device.

16. The non-transitory computer-readable storage medium of claim 14, wherein transmitting the activation request to the management module causes the management module to authenticate the user device and instruct the user device to transition to the activated state.

17. The non-transitory computer-readable storage medium of claim 14, wherein the one or more barrier devices located at the access point are configured to physically block access to the workspace.

18. The non-transitory computer-readable storage medium of claim 14, wherein the one or more barrier devices comprise one or more light curtains, each light curtain corresponding to one or more light emissions emitted at corresponding sensors positioned at the access point and configured to detect movement through the access point.

19. The non-transitory computer-readable storage medium of claim 14, wherein access to the workspace is restricted by the one or more barrier devices prior to receiving the activation response.

20. The non-transitory computer-readable storage medium of claim 14, wherein instructing the one or more actuators causes the one or more actuators to physically manipulate the one or more barrier devices to enable access to the workspace.

* * * * *